United States Patent
Takeyama et al.

(10) Patent No.: US 7,450,138 B2
(45) Date of Patent: Nov. 11, 2008

(54) CONTROLLING TIMING FOR STARTING IMAGE FORMATION

(75) Inventors: Yoshinobu Takeyama, Kanagawa (JP); Shingo Suzuki, Kanagawa (JP); Nobuyuki Yanagawa, Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 234 days.

(21) Appl. No.: 11/350,126

(22) Filed: Feb. 9, 2006

(65) Prior Publication Data
US 2006/0187489 A1    Aug. 24, 2006

(30) Foreign Application Priority Data
Feb. 9, 2005  (JP)  ............................. 2005-033005
Mar. 8, 2005  (JP)  ............................. 2005-063673

(51) Int. Cl.
*G03G 15/01* (2006.01)
(52) U.S. Cl. ...................... 347/116; 347/234; 399/301
(58) Field of Classification Search ................ 347/116, 347/234, 235, 248, 240, 250; 399/301
See application file for complete search history.

(56) References Cited

U.S. PATENT DOCUMENTS

| | | |
|---|---|---|
| 4,365,888 A | 12/1982 | Hosaka et al. |
| 4,837,588 A | 6/1989 | Imakawa et al. |
| 4,962,431 A | 10/1990 | Imakawa et al. |
| 5,059,987 A | 10/1991 | Takeyama et al. |
| 5,294,944 A | 3/1994 | Takeyama et al. |
| 6,222,566 B1 | 4/2001 | Takeyama et al. |
| 6,256,461 B1 | 7/2001 | Takeyama et al. |
| 6,332,066 B1 | 12/2001 | Yanagawa |
| 6,891,554 B2 | 5/2005 | Takeyama et al. |
| 6,919,911 B2 | 7/2005 | Takeyama et al. |
| 2004/0239745 A1 | 12/2004 | Takeyama et al. |
| 2005/0264639 A1* | 12/2005 | Takeyama et al. ........... 347/133 |
| 2005/0285922 A1 | 12/2005 | Suzuki et al. |

FOREIGN PATENT DOCUMENTS

| | | |
|---|---|---|
| JP | 08-142412 | 6/1996 |
| JP | 10-239939 | 9/1998 |
| JP | 11-212009 | 8/1999 |
| JP | 2003-255656 | 9/2003 |

* cited by examiner

*Primary Examiner*—Huan H Tran
(74) *Attorney, Agent, or Firm*—Oblon, Spivak, McClelland, Maier & Neustadt, P.C.

(57) ABSTRACT

Exemplary embodiments provide an apparatus, method, system, computer program and product, each capable of controlling a timing for starting image formation such that when forming a preceding image and a following image, a timing for starting formation of the following image is adjusted based on a timing for starting the preceding image.

10 Claims, 23 Drawing Sheets

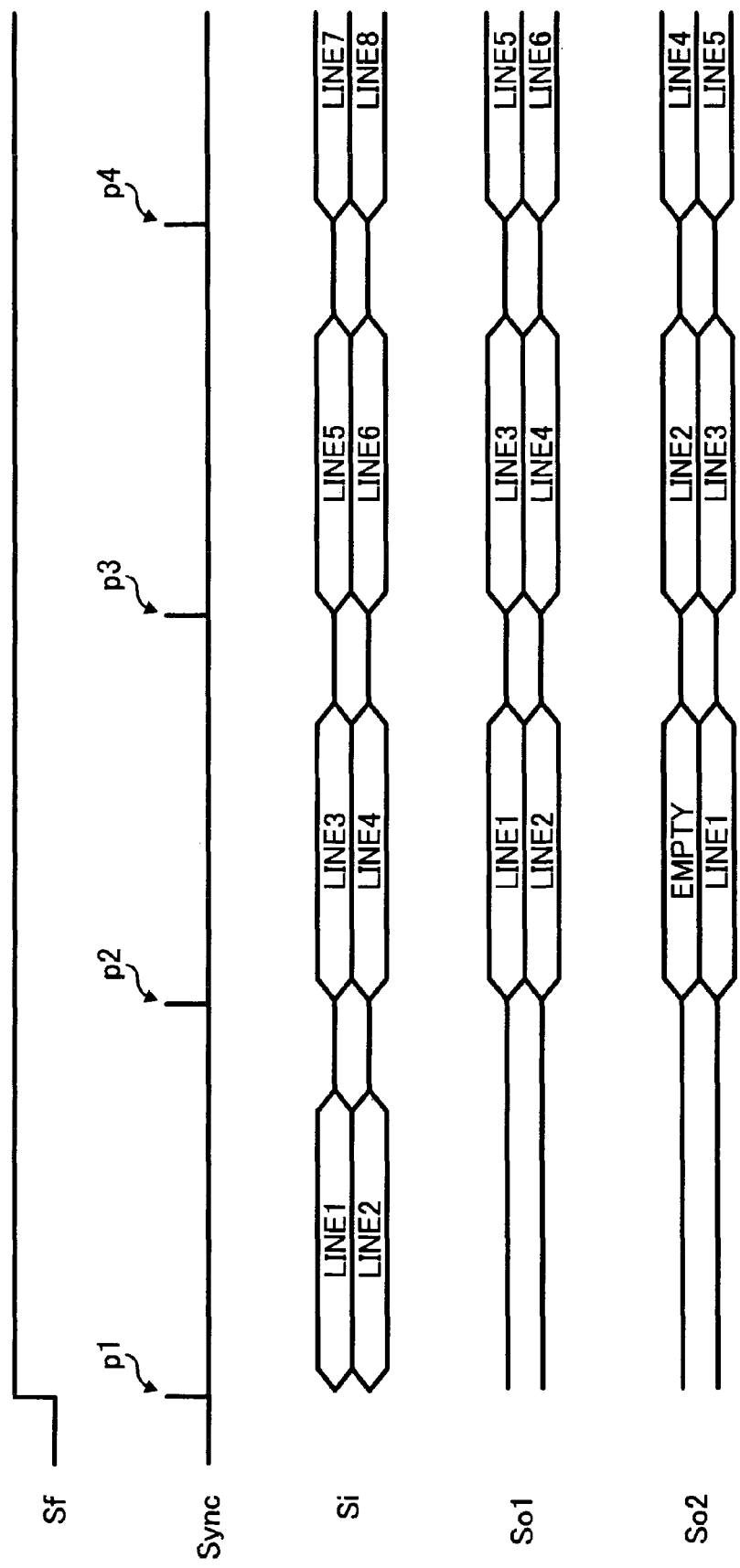

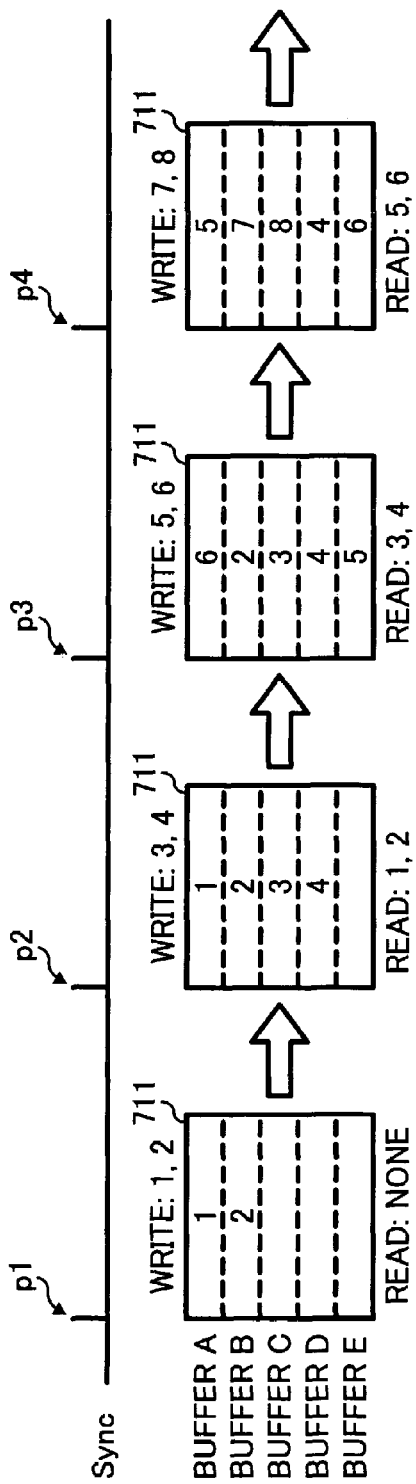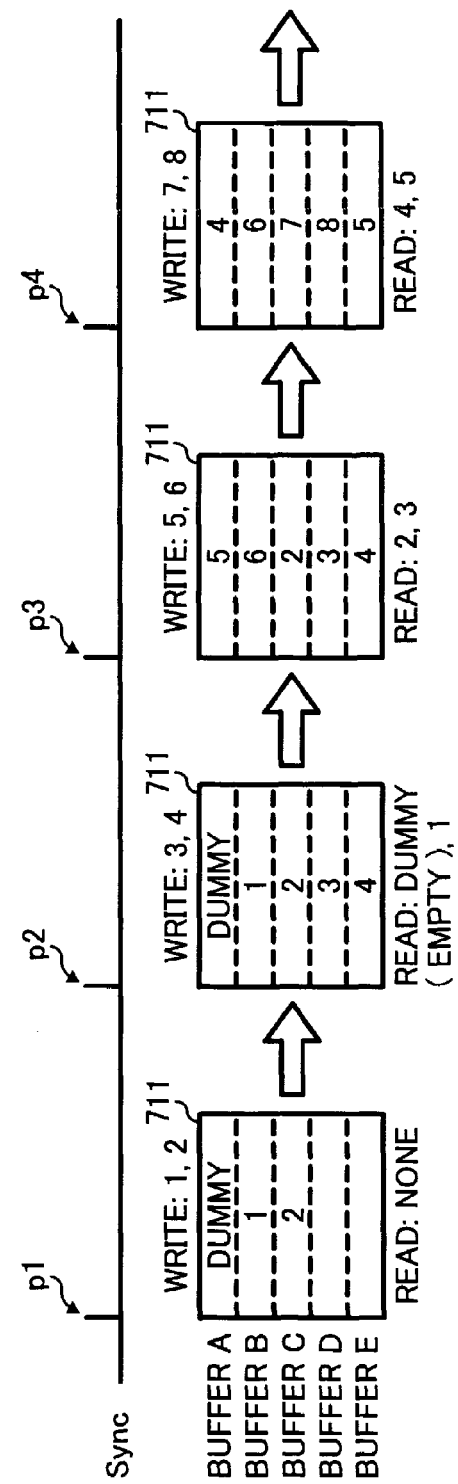
FIG. 7A
FIG. 7B

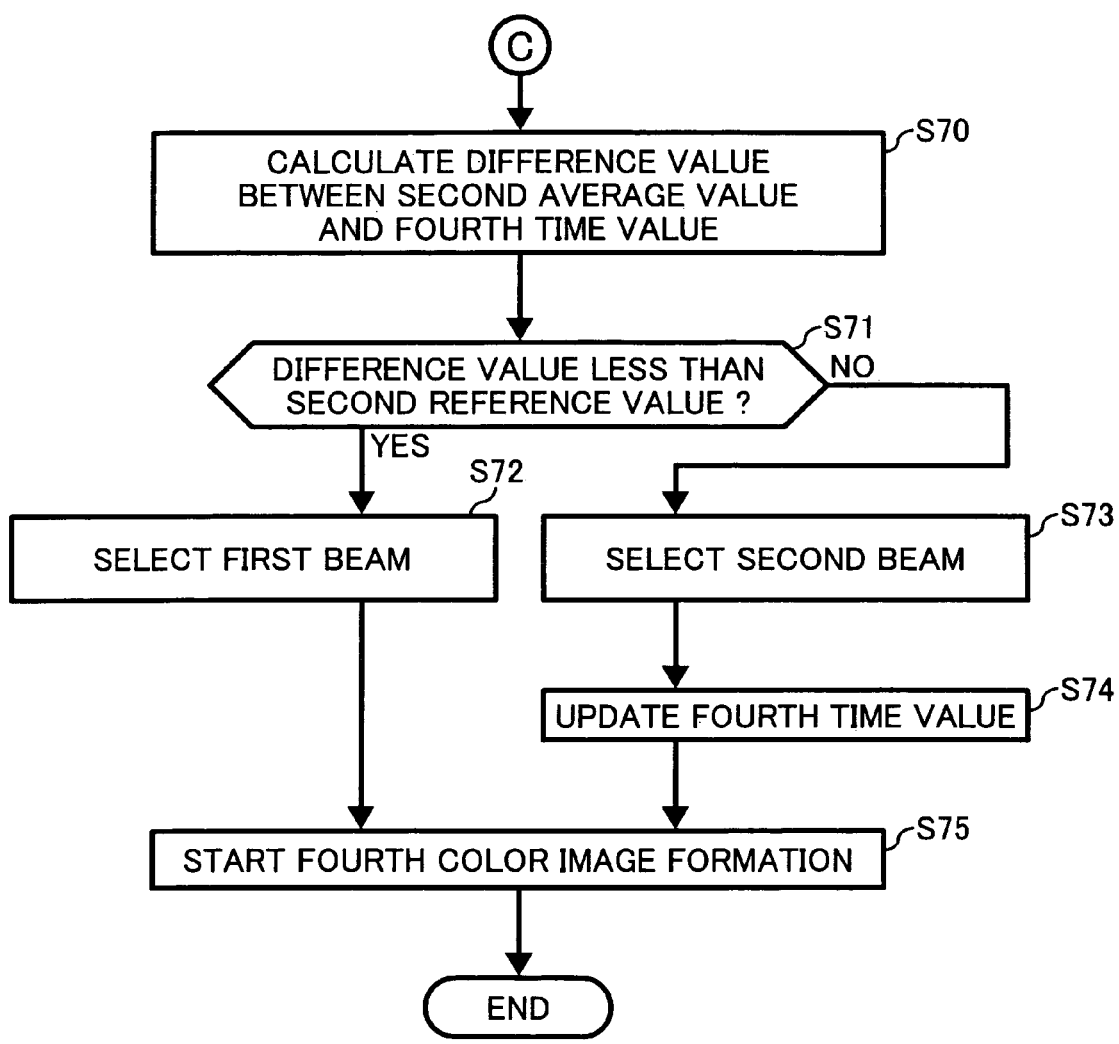

CONTROLLING TIMING FOR STARTING IMAGE FORMATION

CROSS-REFERENCE TO RELATED APPLICATIONS

This patent application is based on and claims priority to Japanese patent application Nos. 2005-033005 filed on Feb. 9, 2005, and 2005-063673 filed on Mar. 8, 2005, in the Japanese Patent Office, the entire contents of which are hereby incorporated by reference.

BACKGROUND OF THE INVENTION

1. Field of the Invention

The following disclosure relates generally to an apparatus, method, system, and computer program and product, for forming an image.

2. Description of the Related Art

To form a full-color image with high quality, a plurality of single-color images need to be superimposed one above the other with high accuracy. In some cases, however, a color registration error may arise due to various factors, such as the fluctuation in rotation speed of an intermediate transfer body, the fluctuation in rotation speed of a polygon mirror, the axial shift of an image carrier, etc.

BRIEF SUMMARY OF THE INVENTION

In view of the above-described and other problems, exemplary embodiments of the present invention provide an apparatus, method, system, computer program and product, each capable of controlling a timing for starting image formation in a main scanning direction.

For example, a full color image is formed by superimposing a first color image, a second color image, a third color image, and a fourth color image one above the other. To indicate a timing for starting formation of the first color image, a first synchronization signal is output after an image formation start signal is output. To indicate a timing for starting formation of the second color image, a second synchronization signal is output after an image forming start signal is output. To indicate a timing for starting formation of the third color image, a third synchronization signal is output after an image forming start signal is output. To indicate a timing for starting formation of the fourth color image, a fourth synchronization signal is output after an image forming start signal is output.

In order to make the image formation timings synchronous for all color images, the timing for starting formation of the second color image is adjusted based on the timing for starting formation of the first color image. Similarly, the timing for starting formation of the third color image is adjusted based on at least one of the timing for starting formation of the first color image and the timing for starting formation of the second color image. Similarly, the timing for starting formation of the fourth color image is adjusted based on at least one of the timing for starting formation of the first color image, the timing for starting formation of the second color image, and the timing for starting formation of the third color image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a timing chart illustrating an image forming start signal, a synchronization signal, an input image data signal and an output image data signal, generated by the image forming apparatus of FIG. 1, according to an exemplary embodiment of the present invention;

FIGS. 7A and B show illustrations for explaining operation of writing and reading, performed by the output controller of FIG. 5, according to an exemplary embodiment of the present invention;

DETAILED DESCRIPTION OF THE INVENTION

Figure 1:
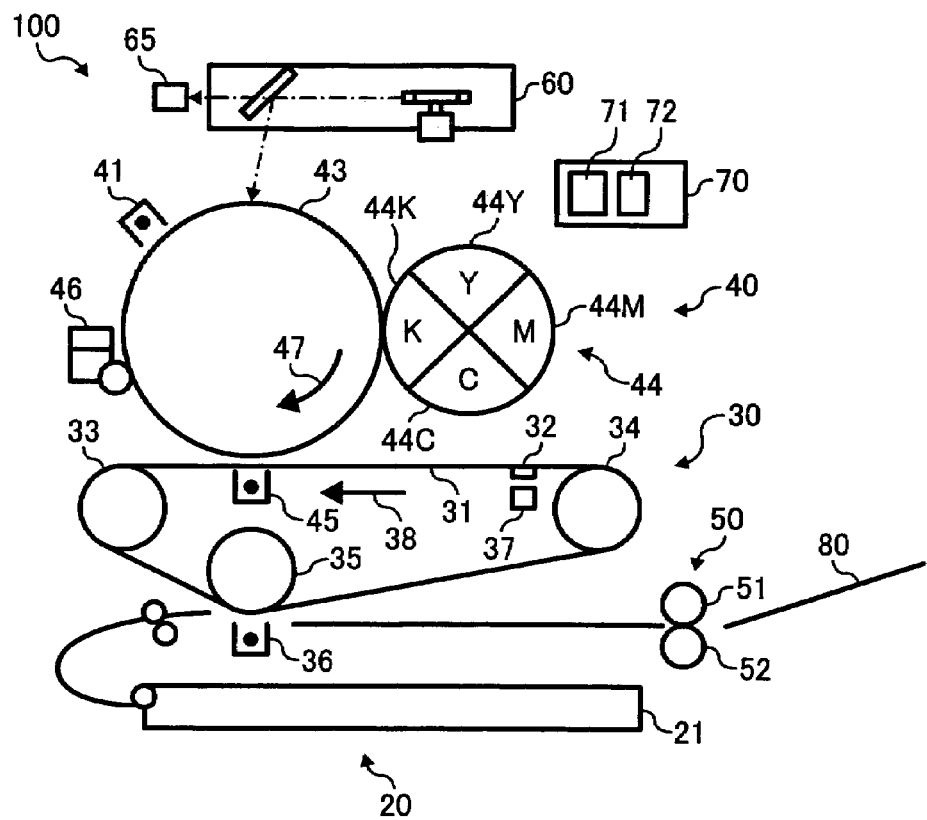
FIG. 1 is a schematic block diagram illustrating the structure of an image forming apparatus according to an exemplary embodiment of the present invention.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image forming apparatus 100 according to an exemplary embodiment of the present invention.

As shown in FIG. 1, the image forming apparatus 100 includes a medium feeding device 20, a transfer device 30, an image forming device 40, a fixing device 50, an optical writing device 60, a control device 70 and a discharging device 80.

The optical writing device 60 converts an original image into an image data signal, and forms a latent image on the surface of an image carrier 43 of the image forming device 40 according to the image data signal using a plurality of light beams.

Figure 2:
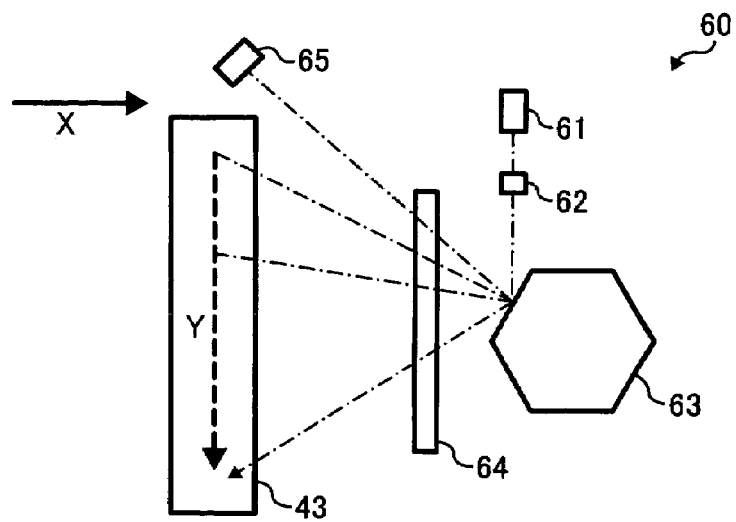
FIG. 2 is a schematic block diagram illustrating the structure of an optical writing device shown in FIG. 1, according to an exemplary embodiment of the present invention.
Figure 5:
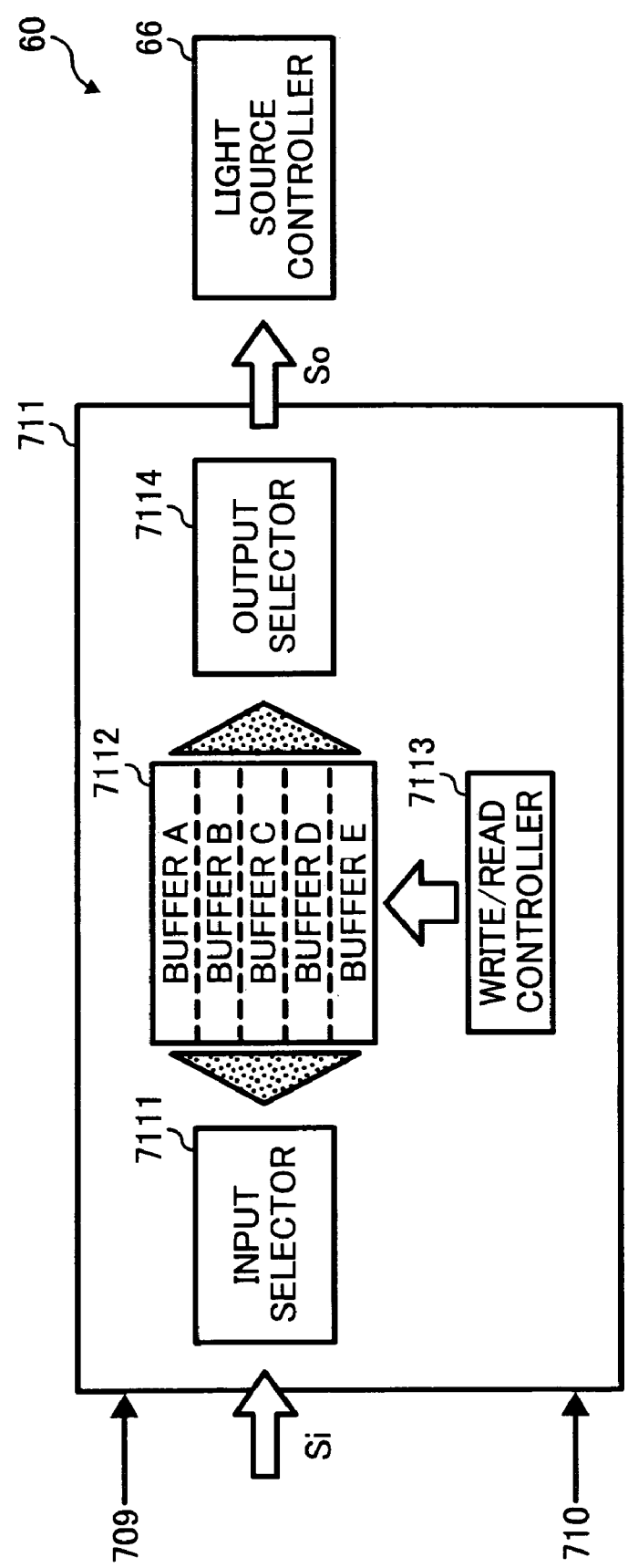
FIG. 5 is a schematic block diagram illustrating the functional structure of an output controller of the timing controller shown in FIG. 4, according to an exemplary embodiment of the present invention.
Figure 8:
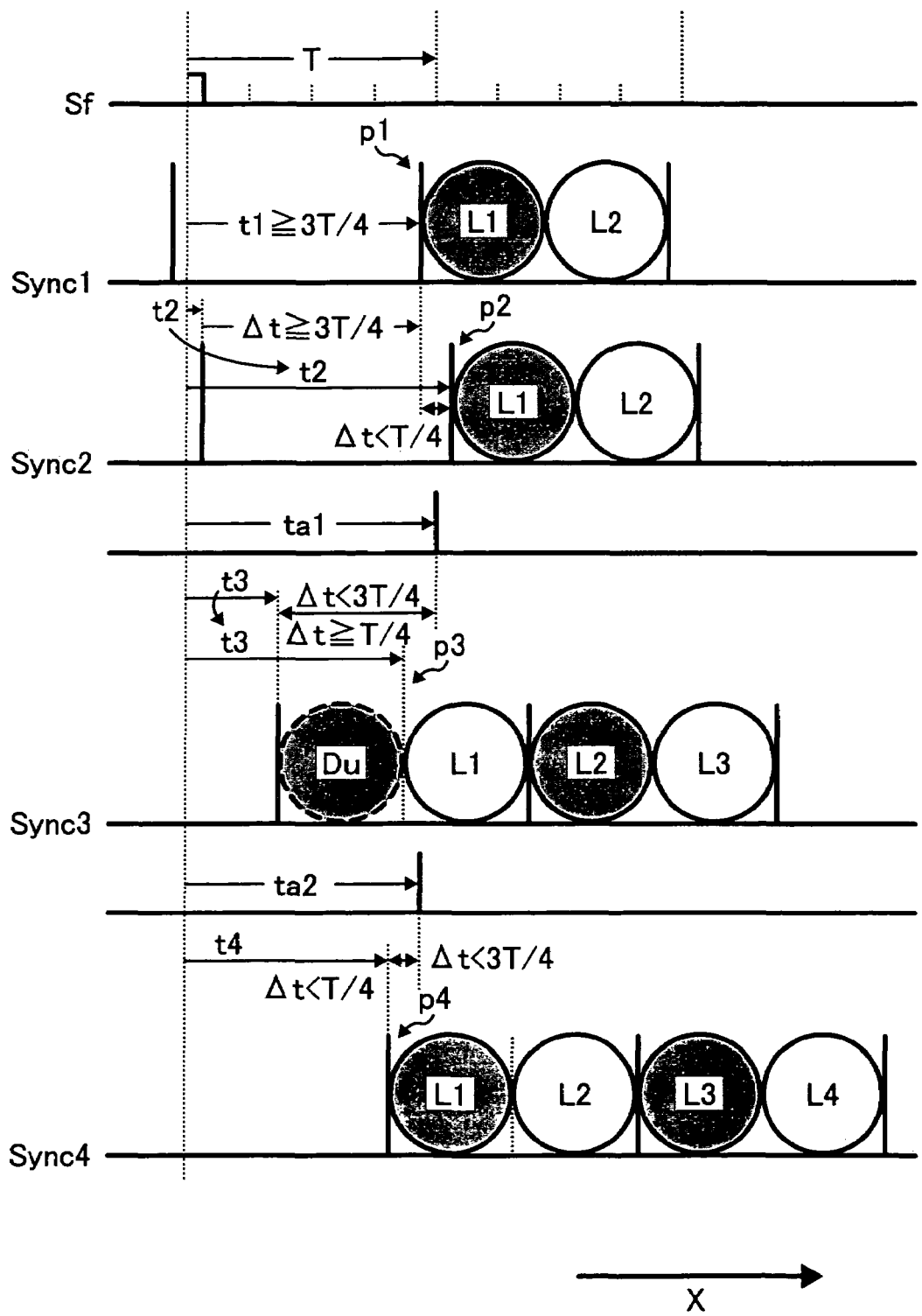
FIG. 8 is an illustration for explaining operation of controlling a timing for starting image formation, performed by the timing controller of FIG. 4, according to an exemplary embodiment of the present invention.

For example, as illustrated in FIG. 2, the optical writing device 60 includes a light source 61, a collimated lens 62, a deflector 63, an imaging lens 64, and a light detector 65. The light source 61 emits a plurality of light beams, which is modulated according to the image data signal under control of a light source controller 66 (FIG. 5). In this example, the light source 61 emits a first light beam and a second light beam to the deflector 63 via the collimated lens 62. The deflector 63, which may be implemented by a rotatable polygon mirror, deflects the light beams onto the surface of the image carrier 43 via the imaging lens 64. More specifically, the deflector 63 is rotated by a drive motor (not shown), which is driven under control of the controller 70. With the rotation of the deflector 63, the first and second light beams are scanned in the main scanning direction Y. At the same time, the image carrier 43 rotates in the sub-scanning direction X. As a result, a latent image is formed, line by line, on the surface of the image carrier 43. In this example, the first light beam is scanned downstream of the image carrier 43 with respect to the rotational direction of the image carrier 43. As a result, as illustrated in FIG. 8, a set of a first beam spot (indicated by the dark color dot in FIG. 8) and a second beam spot (indicated by the white color dot in FIG. 8) is formed on the surface of the image carrier 43 along the sub-scanning direction X.

The light detector 65, which includes a light receiving element, is provided outside of the area on which the latent image is formed, but inside the area scannable by the deflector 63. Using the light receiving element, the light detector 65 detects the light beams deflected from the deflector 63, before the light beams reach the surface of the image carrier 43. Upon detecting the light beams, the light detector 65 generates a main scan synchronization signal ("synchronization signal"). Since the synchronization signal (indicated by p1 in FIG. 8, for example) is output before the set of the first beam spot and the second beam spot is formed on the image carrier 43, the synchronization signal may be used as a reference signal for determining a timing for starting image formation in the main scanning direction Y.

The image forming device 40 includes a charger 41, the image carrier 43, a developer 44, a transfer section 45, and a cleaner 46. The image carrier 43 is rotated in the direction indicated by an arrow 47 of FIG. 1. The charger 41 evenly charges the surface of the image carrier 43. The developer 44 includes a developer 44Y for developing a yellow toner image, a developer 44M for developing a magenta toner image, a developer 44C for developing a cyan toner image, and a developer 44K for developing a black toner image. Using at least one of the developers 44Y to 44K, the developer 44 develops the latent image carried by the image carrier 43 into a toner image. The toner image formed on the image carrier 43 is transferred onto the surface of an intermediate transfer body 31 of the transfer device 30 at a nip formed between the image carrier 43 and the transfer section 45. The cleaner 46 removes a residual toner or developing agent remaining on the image carrier 43, after the toner image is transferred.

The medium feeding device 20 feeds a recording medium, which is previously stored in a medium tray 21, to the transfer device 30.

The transfer device 30 includes the intermediate transfer body 31 having a mark 32, a first drive roller 33, a second drive roller 34, a secondary transfer roller 35, a secondary transfer section 36, and a mark detector 37.

As shown in FIG. 1, the intermediate transfer body 31 may be implemented by an endless belt, which is supported by the first drive roller 33, the second drive roller 34, and the secondary transfer roller 35 so as to face the image forming device 40. The intermediate transfer body 31 is driven by the first driver roller 33 and the second driver roller 34 in the direction indicated by an arrow 38 of FIG. 1, which is opposite to the direction indicated by the arrow 47.

The secondary transfer section 36 is provided at the position facing the secondary transfer roller 35 via the intermediate transfer body 31. The toner image carried by the intermediate transfer body 31 is transferred onto the recording medium, when passing through a nip formed between the secondary transfer roller 35 and the secondary transfer section 36.

The mark detector 37, which is provided so as to face the inner side surface of the intermediate transfer body 31, detects the mark 32. For example, the mark detector 37 includes a light emitting element, such as a light emitting diode (LED), capable of emitting a light onto the inner side surface of the intermediate transfer body 31, and a light receiving element, such as a photosensor, capable of receiving a light reflected from the intermediate transfer body 31. Based on the reflected light, the mark detector 37 detects whether the mark 32 has passed the position facing the mark detector 37. At the time the mark 32 passes, the mark detector 37 outputs an image forming start signal to the controller 70. Thus, an image forming start signal is generated every time the intermediate transfer body 31 rotates one revolution. As illustrated in FIG. 8, the image forming start signal (indicated by Sf in FIG. 8) may be used as a reference signal for determining a timing for starting image formation in the sub-scanning direction X.

The fixing device 50 includes a heating roller 51 and a pressure roller 52. The toner image transferred onto the recording medium is fixed at a nip formed between the heating roller 51 and the pressure roller 52. The recording medium is then output through the discharging device 80.

The controller 70 includes a processor 71 and a memory 72. The processor 71 may be implemented by a central processing unit (CPU) capable of controlling operation of the image forming apparatus 100. The memory 72 may be implemented by any kind of memory capable of storing various data including a timing control program. In one example operation, the controller 70 loads the timing control program to perform various timing control operations including an operation of controlling a timing for starting image formation in the main scanning direction.

For example, when forming a full color image, the optical writing device 60 generates a first synchronization signal, a second synchronization signal, a third synchronization signal, and a fourth synchronization signal, which respectively correspond to the yellow color, the magenta color, the cyan color, and the black color. Further, the mark detector 37 generates an image forming start signal for each of the yellow, magenta, cyan, and black colors. In order to superimpose these four color images with high accuracy to generate the high quality full color image, the synchronization signal and the image forming start signal should be synchronous for each color. However, as illustrated in FIG. 3, the synchronization signal and the image forming start signal are not always synchronous due to various factors including the fluctuations in rotation speed of the deflector 63, the fluctuations in rotation speed of the intermediate transfer body 31, etc.

Figure 3:
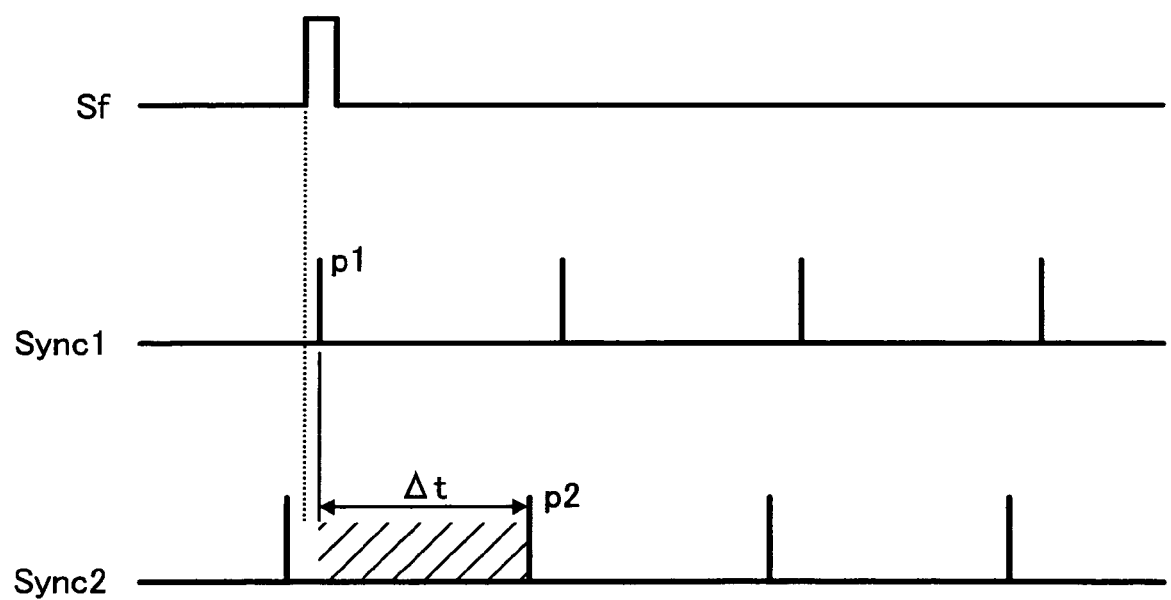
FIG. 3 is a timing chart illustrating an image forming start signal and a main scan synchronization signal, generated by the image forming apparatus of FIG. 1, according to an exemplary embodiment of the present invention.

Referring to FIG. 3, the mark detector 37 outputs an image forming start signal Sf for the yellow color. At substantially the same time, the light detector 65 outputs a synchronization signal Sync1 for the yellow color at a timing p1. Further, the mark detector 37 outputs an image forming start signal Sf for the magenta color. At substantially the same time, the light detector 65 outputs a synchronization signal Sync 2 for the magenta color at a timing p2. In this example, the yellow image is started to form at the timing p1, while magenta image is started to form at the timing p2. If the difference $\Delta t$ between the timing p1 and the timing p2 is large, the yellow image and the magenta image may not be superimposed with high accuracy.

Figure 4:
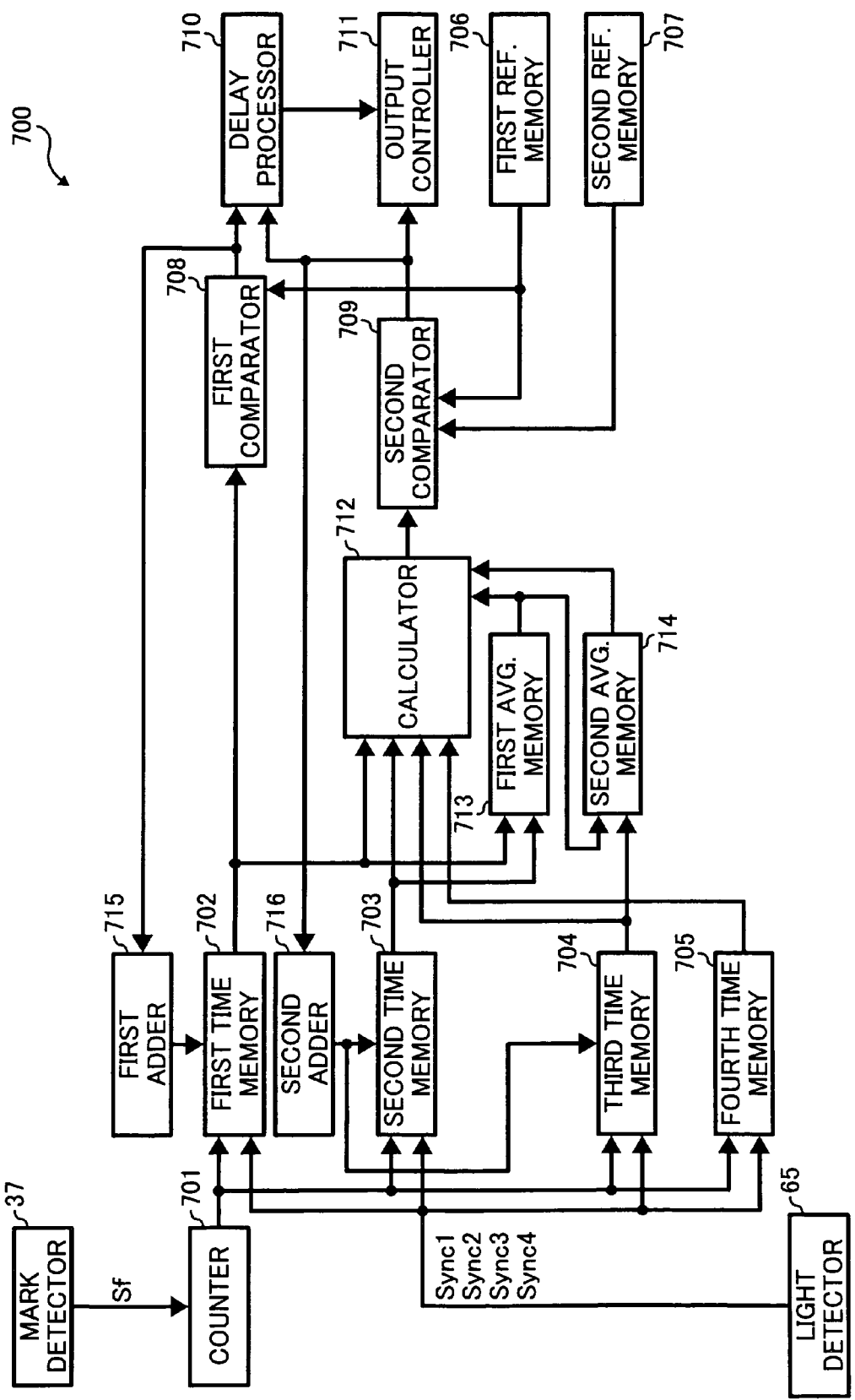
FIG. 4 is a schematic block diagram illustrating the functional structure of a timing controller incorporated in the image forming apparatus of FIG. 1, according to an exemplary embodiment of the present invention.

In light of the above, in one example, the controller 70 may be provided with a timing controller 700 of FIG. 4, which controls a timing for starting image formation in the main scanning direction. As shown in FIG. 4, the timing controller 700 includes a counter 701, a first time memory 702, a second time memory 703, a third time memory 704, a fourth time memory 705, a first reference memory 706, a second reference memory 707, a first comparator 708, a second comparator 709, a delay processor 710, an output controller 711, a calculator 712, a first average memory 713, a second average memory 714, a first adder 715, and a second adder 716.

The counter 701 counts the value of a time period from a timing when the image forming start signal Sf is detected. In one example, the counter 701 counts the value of a time period from a timing when the image forming starting signal Sf for the first color is detected. Once image formation is started for the first color, the counter 701 may stop counting until it receives an image forming start signal Sf for the second color.

The first time memory 702 stores a first time value t1, which indicates a timing for starting formation of the first color image. Initially, the first time value t1 is set to be equal to a time period between the timing when the image forming start signal Sf for the first color is detected and the timing when a synchronization signal Sync1 for the first color is firstly detected.

The second time memory 703 stores a second time value t2, which indicates a timing for starting formation of the second color image. Initially, the second time value t2 is set to be equal to a time period between the timing when the image forming start signal Sf for the second color is detected and the timing when a synchronization signal Sync2 for the second color is firstly detected.

The third time memory 704 stores a third time value t3, which indicates a timing for starting formation of the third color image. Initially, the third time value t3 is set to be equal to a time period between the timing when the image forming start signal Sf for the third color is detected and the timing when a synchronization signal Sync3 for the third color is firstly detected.

The fourth time memory 705 stores a fourth time value t4, which indicates a timing for starting formation of the fourth color image. Initially, the fourth time value t4 is set to be equal to a time period between the timing when the image forming start signal Sf for the fourth color is detected and the timing when a synchronization signal Sync4 for the fourth color is firstly detected.

The first reference memory 706 stores a first reference value S1, which is previously determined. The second reference memory 707 stores a second reference value S2, which is previously determined.

The first comparator 708 compares the first time value t1 with the first reference value S1 to generate a first comparison result; which determines whether the firstly detected synchronization signal Sync1 should be used as a reference synchronization signal for the first color. In this example, the first time value t1 is determined based on the reference synchronization signal Sync1.

The first average memory 713 averages the first time value t1 and the second time value t2 to obtain a first average value ta1.

The second average memory 714 averages the first time value t1, the second time value t2, and the third time value t3 to obtain a second average value ta2. For example, the second average memory 714 selects a maximum value and a minimum value from the first time value t1, the second time value t2, and the third time value t3. The second average value ta2 is obtained by averaging the maximum and minimum values.

The calculator 712 obtains various difference values $\Delta t$. For example, the calculator 712 obtains a difference value $\Delta t$ between the first time value t1 and the second time value t2, a difference value $\Delta t$ between the third time value t3 and the first average value ta1, a difference value $\Delta t$ between the fourth time value t4 and the second average value ta2.

The second comparator 709 compares the difference value $\Delta t$ with the first reference value S1 to generate a second comparison result, which determines whether the firstly detected synchronization signal should be used as a reference synchronization signal.

In one example, the second comparator 709 compares the difference value Δt of the first time value t1 and the second time value t2 with the first reference value S1 to generate a second comparison result, which determines whether the firstly detected synchronization signal Sync2 should be use as a reference synchronization signal for the second color. In this example, the reference synchronization signal for the second color is used to determine the second time value t2.

In another example, the second comparator 709 compares the difference value Δt of the first average value ta1 and the third time value t3 with the first reference value S1 to generate a second comparison result, which determines whether the firstly detected synchronization signal Sync3 should be used as a reference synchronization signal for the third color. In this example, the reference synchronization signal for the third color is used to determine the third time value t3.

In another example, the second comparator 709 compares the difference value Δt of the second average value ta2 and the fourth time value t4 with the first reference value S1 to generate a second comparison result, which determines whether the firstly detected synchronization signal Sync4 should be used as a reference synchronization signal for the fourth color. In this example, the reference synchronization signal for the fourth color is used to determine the fourth time value t4.

Further, the second comparator 709 compares the difference value Δt with the second reference value S2 to generate a third comparison result, which determines whether a first beam should be used as a reference beam. In this example, the reference beam corresponds to a beam, which will be used for writing a first line of the image data signal after image formation is started. Thus, any one of the second time value t2, the third time value t3, and the fourth time value t4 may be determined based on the reference beam.

In one example, the second comparator 709 compares the difference value Δt of the first time value t1 and the second time value t2 with the second reference value S2 to generate a third comparison result, which determines whether the first beam should be used as a reference beam for the second color. In another example, the second comparator 709 compares the difference value Δt of the first average value ta1 and the third time value t3 with the second reference value S2 to generate a third comparison result, which determines whether the first beam should be used as a reference beam for the third color. In another example, the comparator 709 compares the difference value Δt of the second average value ta2 and the fourth time value t4 with the second reference value S2 to generate a third comparison result, which determines whether the first beam should be used as a reference beam for the fourth color.

The delay processor 710 determines whether a timing for starting image formation, which is initially set according to the firstly detected synchronization signal, should be delayed.

In one example, the delay processor 710 determines whether the timing for starting formation of the first color image, which is initially set to be equal to the timing when the synchronization signal Sync1 is firstly detected, should be delayed based on the first comparison result. When the first comparison result indicates that the firstly detected synchronization signal Sync1 should be used as a reference synchronization signal for the first color, the delay processor 710 causes the output controller 711 to start first color image formation at a timing corresponding to the firstly detected synchronization signal Sync1. When the first comparison result indicates that the secondly detected synchronization signal Sync1 should be used as a reference synchronization signal for the first color, the delay processor 710 causes the output controller 711 to delay a timing for starting first color image formation for one period cycle T.

In another example, the delay processor 710 determines whether the timing for starting formation of the second color image, which is initially set to be the timing when the synchronization signal Sync2 is firstly detected, should be delayed based on the second comparison result. In another example, the delay processor 710 determines whether the timing for starting formation of the third color image, which is initially set to be the timing when the synchronization signal Sync3 is firstly detected, should be delayed based on the second comparison result. In another example, the delay processor 710 determines whether the timing for starting formation of the fourth color image, which is initially set to be the timing when the synchronization signal Sync4 is firstly detected.

The first adder 715 updates the current value of the first time period t1 based on the first comparison result. In one example, when the first comparison result indicates that the firstly detected synchronization signal Sync1 should be used as a reference synchronization signal for the first color, the first adder 715 does not update the first time value t1. In another example, when the first comparison result indicates that the secondly detected synchronization signal Sync1 should be used as a reference synchronization signal for the first color, the first adder 715 updates the first time value t1 by adding the period cycle T. In this manner, the first time value t1 can accurately indicate a timing for starting formation of the first color image.

The second adder 716 updates the second time value t2, the third time value t3, or the fourth time value t4, based on the second comparison result. In one example, when the second comparison result indicates that the firstly detected synchronization signal Sync2 should be used as a reference synchronization signal for the second color, the second adder 716 does not update the second time value t2. In another example, when the second comparison result indicates that the secondly detected synchronization signal Sync2 should be used as a reference synchronization signal for the second color, the second adder 716 updates the second time value t2 by adding the period cycle T.

Further, the second adder 716 updates the second time value t2, the third time value t3, or the fourth time value t4, based on the third comparison result. In one example, when the third comparison result indicates that the first beam should be used as a reference beam for the second color, the second adder 716 does not update the second time value t2. In another example, when the third comparison result indicates that the second beam should be used as a reference bam for the second color, the second adder 716 updates the second time value t2 by adding the half value of the periodic cycle T, i.e., 2/T.

The output controller 711 causes the optical writing device 60 to sequentially perform first color image formation at a timing indicated by the first time value t1, second color image formation at a timing indicated by the second time value t2, third color image formation at a timing indicated by the third time value t3, and fourth color image formation at a timing indicated by the fourth time value t4. In this example, the first time value t1 is determined based on the reference synchronization signal for the first color, and a reference beam for the first color, which is set to be the first beam by default. The second time value t2 is determined based on the reference synchronization signal for the second color and the reference beam for the second color. The third time value t3 is determined based on the reference synchronization signal for the third color and the reference beam for the third color. The fourth time value t4 is determined based on the reference synchronization signal for the fourth color and the reference beam for the fourth color.

In this example, as illustrated in FIG. 5, the output controller 711 includes an input selector 7111, a ring buffer 7112, a write/read controller 7113, and an output selector 7114. The ring buffer 7112 includes a plurality of line buffer memories, such as a buffer A, a buffer B, a buffer C, a buffer D, and a buffer E.

The input selector 7111 inputs an input image data signal Si, which is generated by the optical writing device 60, to one of the buffers A to E of the ring buffer 7112. As illustrated in FIG. 6, the input image data signal Si is input as a set of two lines after the image forming start signal Sf is detected. In this example, the input selector 7111 inputs the input image data signal Si according to the instruction received by the delay processor 710. When the delay processor 710 instructs the output controller 7111 to start image formation at a timing corresponding to the firstly detected synchronization signal Sync, the input image data signal Si is input at a timing p1. When the delay processor 710 instructs the output controller 7111 to delay image formation for one periodic cycle T, the input image data signal Si is input at a timing p2 corresponding to the secondly detected synchronization signal.

Further, the input selector 7111 selects one of the buffers A to E based on the third comparison result output by the second comparator 709. For example, when the third comparison result indicates that the first beam should be used as a reference beam, the input processor 7111 writes the preceding line ("Line 1" in FIG. 6) of the input image data signal Si in the buffer A of the ring buffer 7112, and the following line ("Line 2" in FIG. 6) of the input image data signal Si in the buffer B of the ring buffer 7112, as illustrated in FIG. 7A. When the third comparison result indicates that the second beam should be used as a reference beam, the input processor 7111 writes dummy data ("Empty" in FIG. 6) in the buffer A of the ring buffer 7112, the preceding line ("Line 1" in FIG. 6) of the input image data signal Si in the buffer B of the ring buffer 7112, and the following line ("Line 2" in FIG. 6) of the input image data signal Si in the buffer C of the ring buffer 7112, as illustrated in FIG. 7B. In this example, the dummy data does not contain any information that should be written by the optical writing device 60.

The output selector 7114 outputs an output image data signal So to the light source controller 66 of the optical writing device 60. As illustrated in FIG. 6, the output image data signal So1 or So2 is output as a set of the preceding line and the following line. The preceding line of the output image data signal So1 or So2 is written with the first beam, while the following line of the output image data signal So1 or So2 is written with the second beam. In one example, when the third comparison result indicates that the first beam should be used as a reference beam, the output selector 714 outputs the output image data signal So1 of FIG. 6. In another example, when the third comparison result indicates that the second beam should be used as a reference beam, the output selector 714 outputs the output image data signal So2 of FIG. 6.

The write/read controller 7113 alternates the writing and reading functions of the ring buffer 7112, as illustrated in FIGS. 7A and 7B, after the first set of the preceding and following lines of the input image data signal Si is input. For the illustrative purpose, the input image data signal Si is assumed to be input as a series of lines including a first line 1, a second line 2, a third line 3, a fourth line 4, a fifth line 5, a sixth line 6, a seventh line 7, and an eight line 8.

When the first beam is selected as the reference beam as illustrated in FIG. 7A, the first line 1 and the second line 2 of the input image data signal Si are respectively written in the buffer A and the buffer B at the timing p1. At this time, the reading function is not performed. At the timing p2, the third line 3 and the fourth line 4 are respectively written in the buffer C and the buffer D. At the same time, the first line 1 and the second line 2 are read to be output by the output selector 7114 as the output image data signal So1 of FIG. 6. At the timing p3, the fifth line 5 and the sixth line 6 of the input image data signal Si are respectively written in the buffer E and the buffer A. At the same time, the third line 3 and the fourth line 4 are read to be output by the output selector 7114 as the output image data signal So1 of FIG. 6. At the timing p4, the seventh line 7 and the eight line 8 of the input image data signal Si are respectively written in the buffer B and the buffer C. At the same time, the fifth line 5 and the sixth line 6 are read to be output by the output selector 7114 as the output image data signal So1 of FIG. 6.

When the second beam is selected as the reference beam as illustrated in FIG. 7B, the dummy data, and the first line 1 and the second line 2 of the input image data signal Si are respectively written in the buffer A, the buffer B, and the buffer C at the timing p1. At this time, the reading function is not performed. At the timing p2, the third line 3 and the fourth line 4 of the input image data signal Si are respectively written in the buffer D and the buffer E. At the same time, the dummy data and the first line 1 are read to be output by the output selector 7114 as the output image data signal So2 of FIG. 6. At the timing p3, the fifth line 5 and the sixth line 6 are respectively written in the buffer A and the buffer B. At the same time, the second line 2 and the third line 3 are read to be output by the output selector 7114 as the output image data signal So2 of FIG. 6. At the timing p4, the seventh line 7 and the eight line 8 are respectively written in the buffer C and the buffer D. At the same time, the fourth line 4 and the fifth line 5 are read to be output by the output selector 7114 as the output image data signal So2 of FIG. 6.

Figure 9:
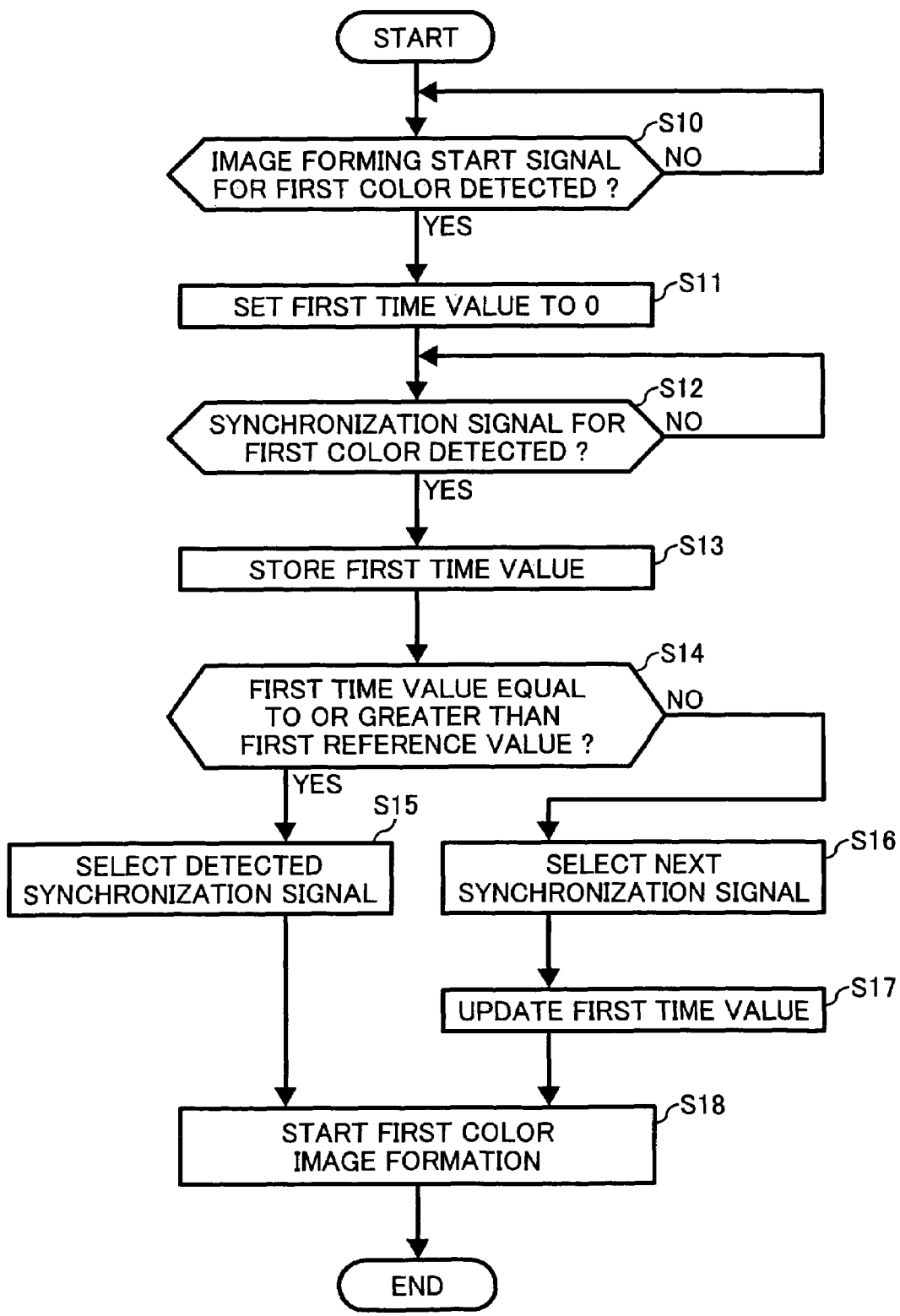
FIG. 9 is a flowchart illustrating operation of controlling a timing for starting first color image formation, performed by the timing controller of FIG. 4, according to an exemplary embodiment of the present invention.
Figure 10A:
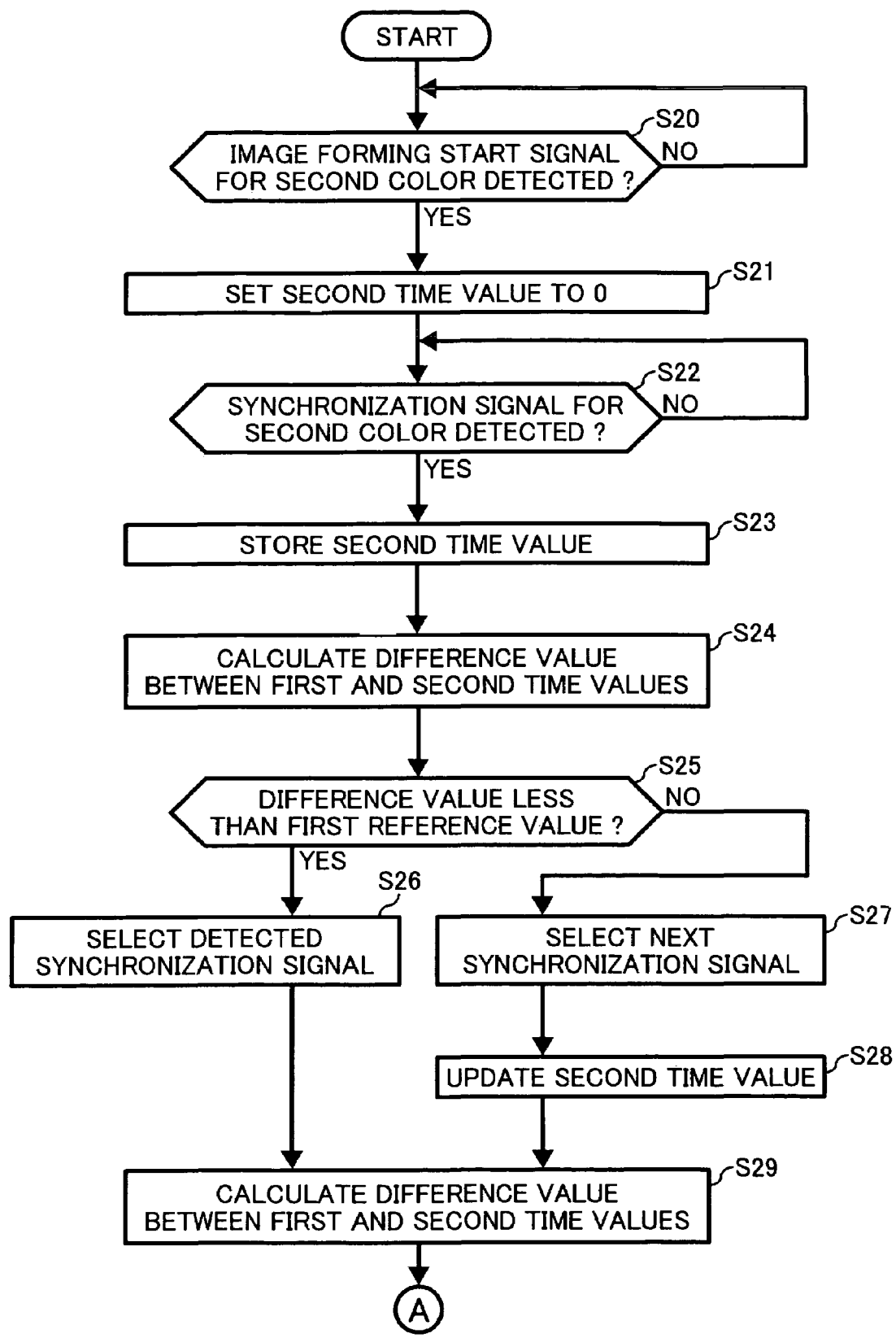
FIGS. 10A and B show flowcharts illustrating operation of controlling a timing for starting second color image formation, performed by the timing controller of FIG. 4, according to an exemplary embodiment of the present invention.
Figure 10B:
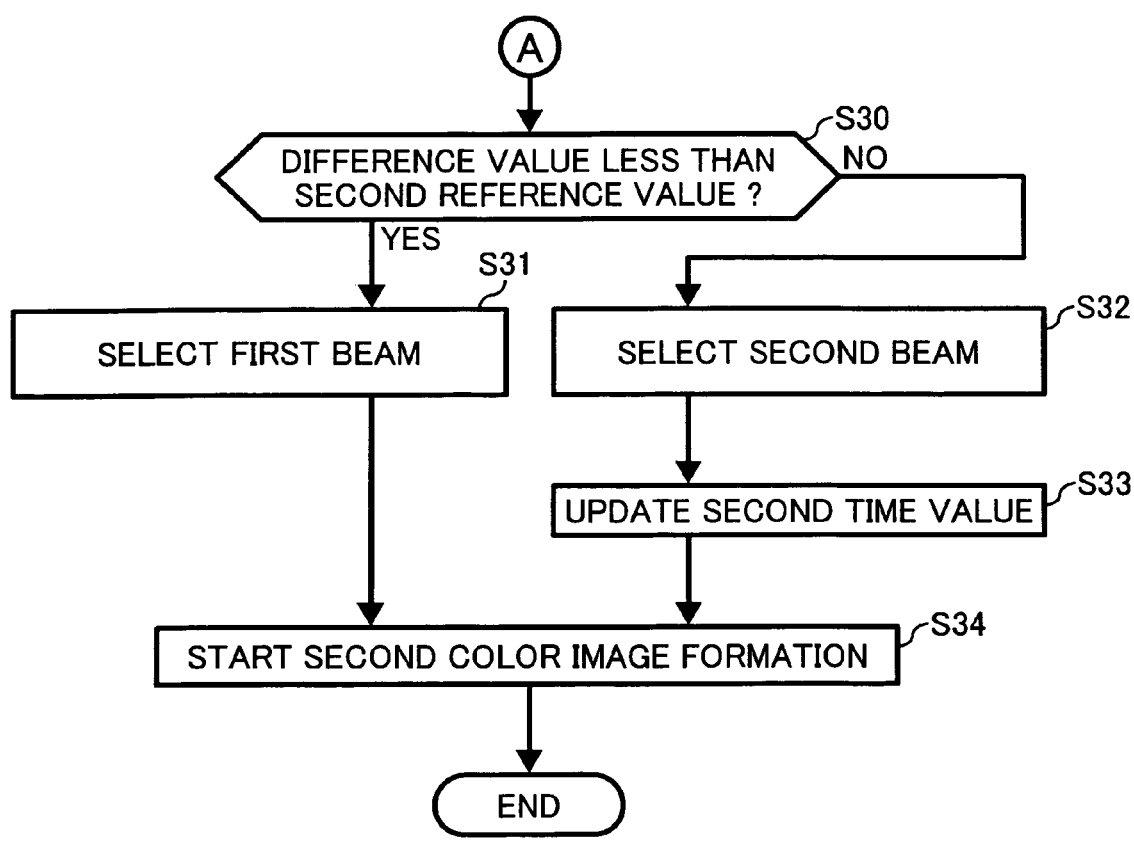
Figure 11A:
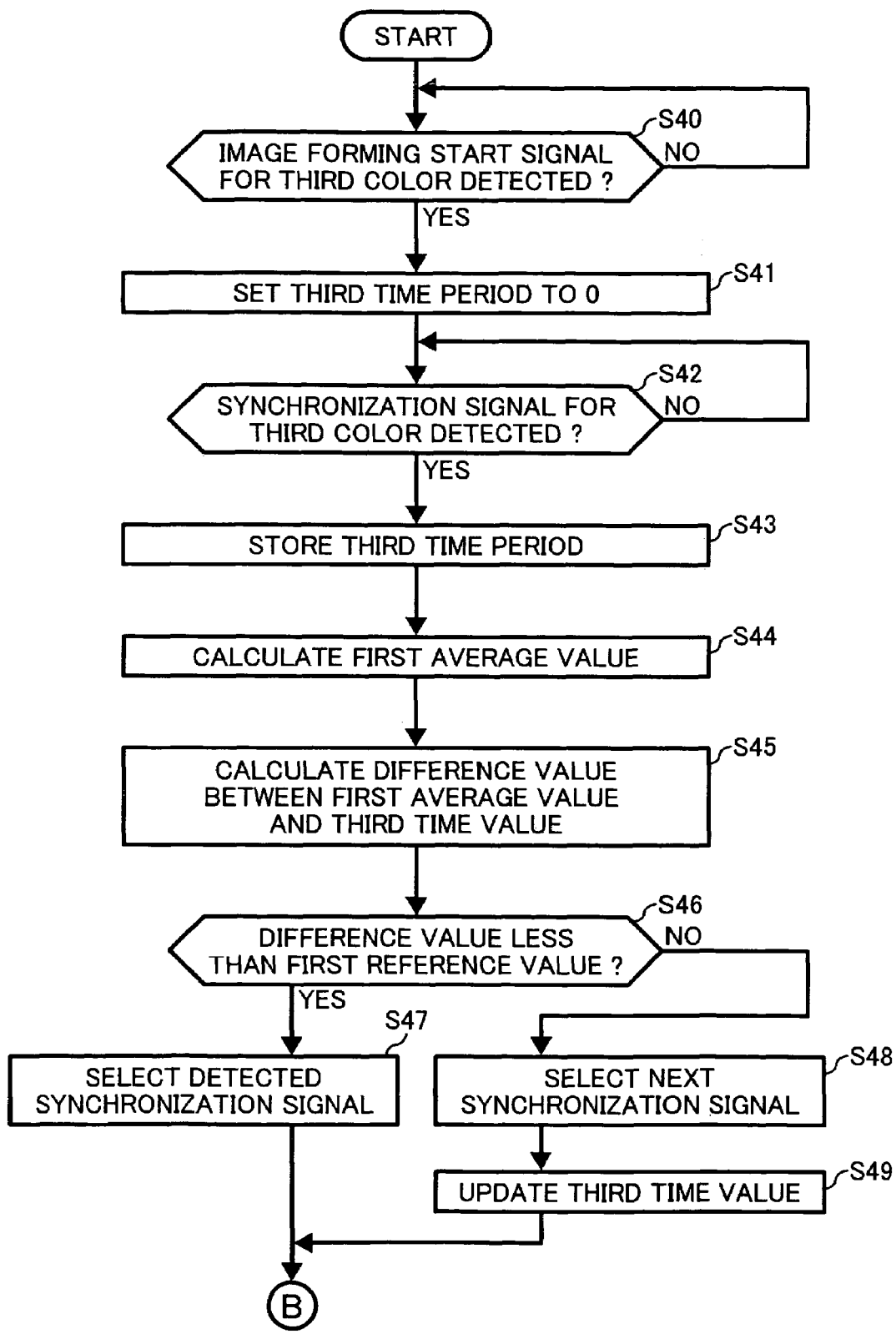
FIG. 11 is a flowchart illustrating operation of controlling a timing for starting third color image formation, performed by the timing controller of FIG. 4, according to an exemplary embodiment of the present invention.
Figure 11B:
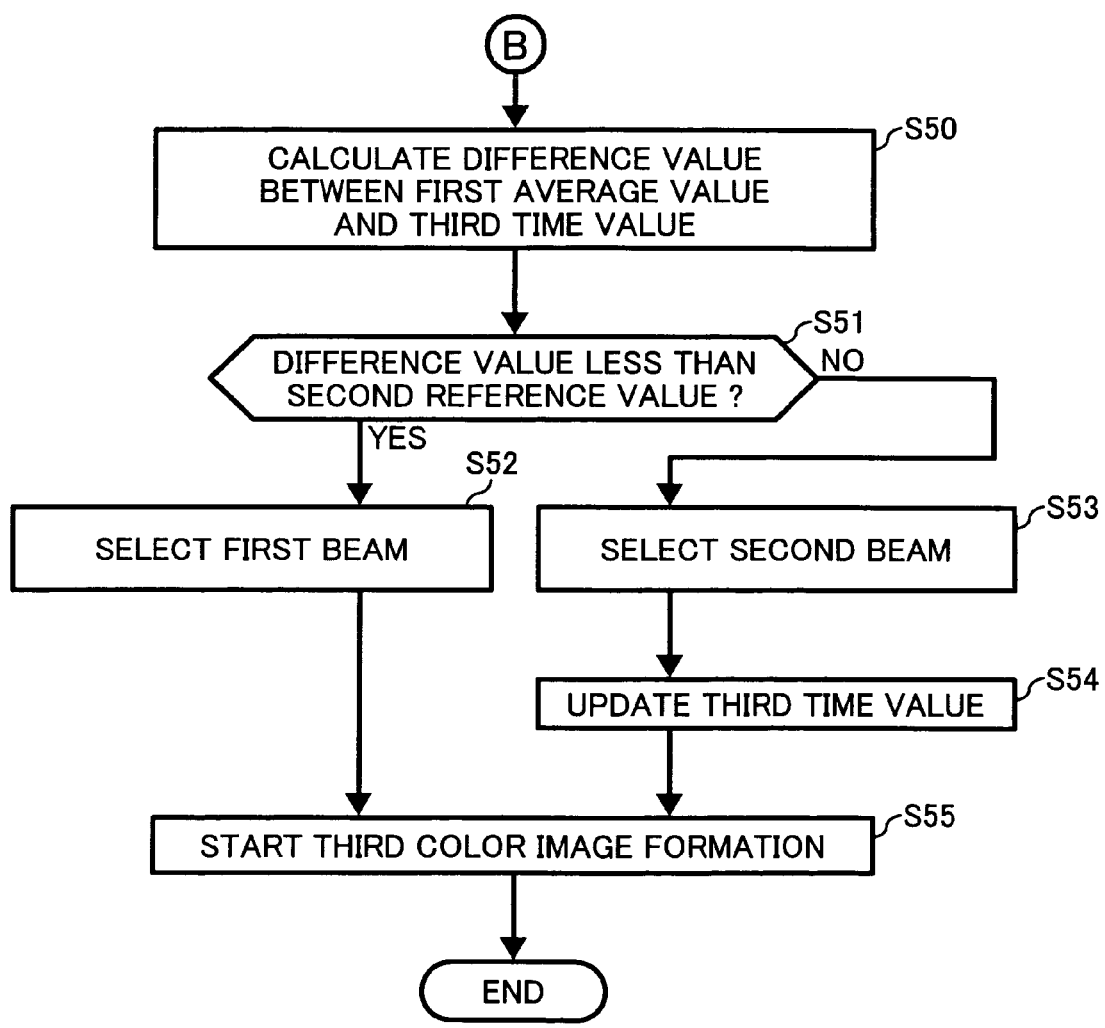
Figure 12A:
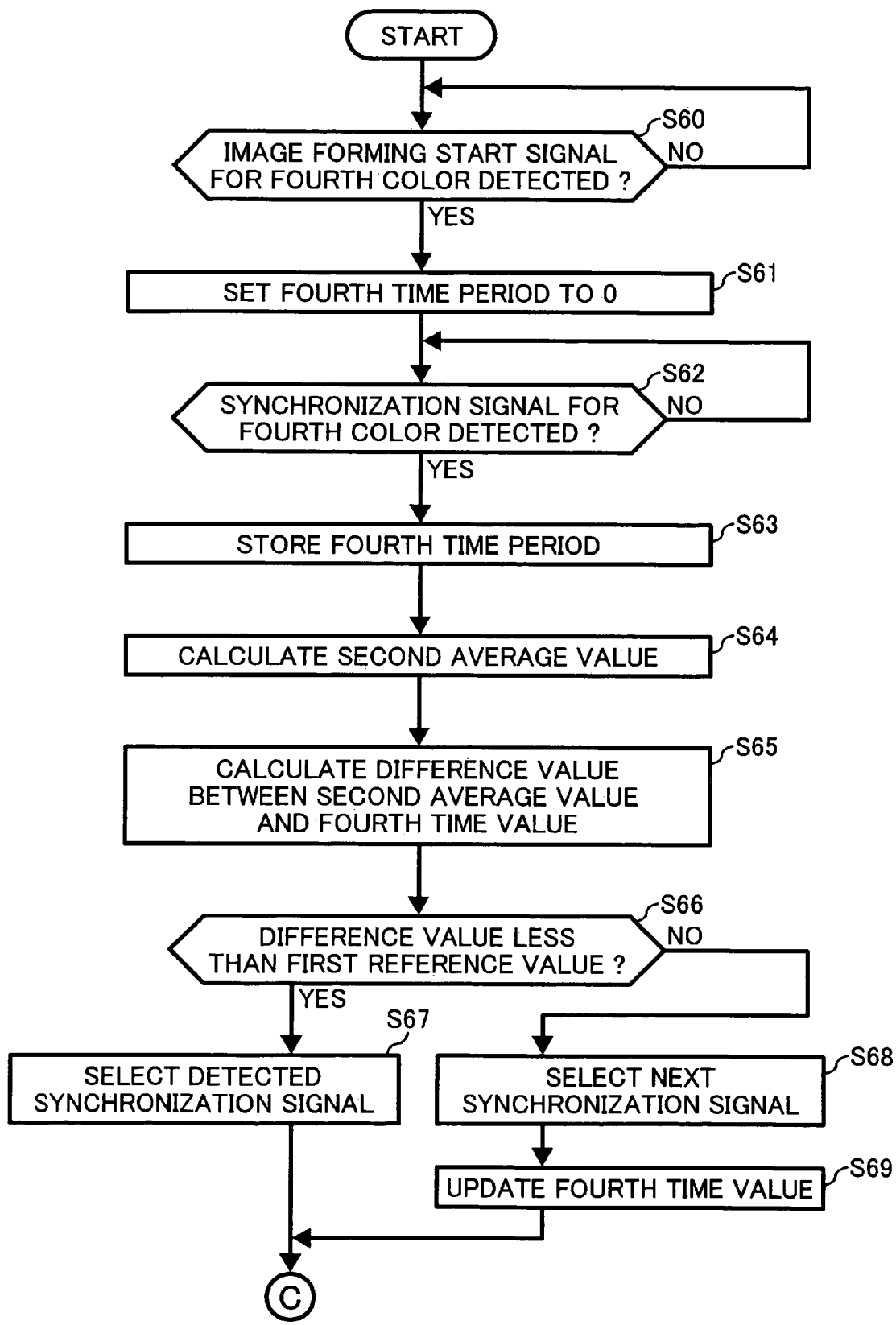
FIGS. 12A and B show flowcharts illustrating operation of controlling a timing for starting fourth color image formation, performed by the timing controller of FIG. 4, according to an exemplary embodiment of the present invention.

Referring now to FIGS. 8 to 12, operation of controlling a timing for starting image formation is explained according to an exemplary embodiment of the present invention. Upon receiving an instruction from the processor 71 for starting image formation, the timing controller 700 of FIG. 4 sequentially performs a first operation of controlling a timing for starting first color image formation as illustrated in FIG. 9, a second operation of controlling a timing for starting second color image formation as illustrated in FIG. 10, a third operation of controlling a timing for starting third color image formation as illustrated in FIG. 11, and a fourth operation of controlling a timing for starting fourth color image formation as illustrated in FIG. 12.

Referring now to FIGS. 8 and 9, the first operation of controlling a timing for starting first color image formation in the main scanning direction is explained according to an exemplary embodiment of the present invention.

Step S10 of FIG. 9 determines whether an image forming start signal Sf for the first color is detected. If the image forming start signal Sf is detected ("YES" in Step S10), the operation proceeds to Step S11. Otherwise ("NO" in Step S10), the operation repeats Step S10.

Step S11 sets a counter value to 0 to start counting the value of the first time period t1 based on a reference clock signal.

Step S12 determines whether a synchronization signal Sync1 for the first color is detected. If the synchronization signal Sync1 is detected ("YES" in Step S12), the operation proceeds to Step S13. Otherwise ("NO" in Step S12), the operation repeats Step S12.

Step S13 obtains the current counter value, and stores the counter value in the first time memory 702 as the initial value of the first time value t1. Any one of Steps S11, S12, and S13 may be performed by the counter 701 of FIG. 4.

Step S14 determines whether the first time value t1 is equal to or greater than the first reference value S1, which is stored in the first reference memory 706. If the first time value t1 is equal to or greater than the first reference value S1 ("YES" in Step S14), the operation proceeds to Step S15. If the first time value t1 is less than the first reference value S1 ("NO" in Step S14), the operation proceeds to Step S16. Step S14 may be performed by the first comparator 708 of FIG. 4.

In this example, the first reference value S1 is previously determined based on the number n of light beams emitted by the optical writing device 60 and the periodic cycle T of the synchronization signal Sync as indicated by the equation: $(2n-1)T/2n$. Since the light beam number n is equal to 2 in this example, the first reference value S1 can be expressed as $3T/4$. For example, as illustrated in FIG. 8, if the first time value t1 is equal to or greater than $3T/4$, the operation proceeds to Step S15.

Step S15 selects the synchronization signal Sync1, which is detected in Step S12, i.e., the firstly detected synchronization signal Sync1, to be a reference synchronization signal. For example, in the example case illustrated in FIG. 8, the synchronization signal Sync1 following the image forming start signal Sf is selected as a reference synchronization signal for the first color.

Step S16 selects the synchronization signal Sync1, which is detected after the detection of the firstly detected synchronization signal Sync1, i.e., the secondly detected synchronization signal, to be a reference synchronization signal. Steps S15 and S16 may be performed by the first comparator 708.

Step S17 updates the first time value t1 stored in the first time memory 702, by adding the value of the periodic cycle T to the initial value of the first time period t1. In this manner, the first time value t1 can accurately indicate a timing for starting first color image formation in the main scanning direction. Step S17 may be performed by the first adder 715.

Step S18 starts first color image formation at a timing determined by the reference synchronization signal selected in the previous step. For example, as illustrated in FIG. 8, when the firstly detected synchronization signal Sync1 is used as a reference synchronization signal, the preceding line ("L1" in FIG. 8) of the image data signal for the first color is written using the first light beam (corresponding to the dark color dot) at the timing p1. At the same time, the following line ("L2" in FIG. 8) of the image data signal for the first color is written using the second light beam (corresponding to the white color dot). Step S18 may be performed by the output controller 711 of FIG. 4.

As a result, the first color latent image is formed on the surface of the image carrier 43. The first color latent image is then developed by the developer 44 into the first color toner image for further processing.

Referring now to FIGS. 8 and 10, the second operation of controlling a timing for starting second color image formation in the main scanning direction is explained according to an exemplary embodiment of the present invention.

Step S20 of FIG. 10 determines whether an image forming start signal Sf for the second color is detected. If the image forming start signal Sf is detected ("YES" in Step S20), the operation proceeds to Step S21. Otherwise ("NO" in Step S20), the operation repeats Step S20.

Step S21 sets a counter value to 0 to start counting the value of the second time period t2 based on the reference clock signal.

Step S22 determines whether a synchronization signal Sync2 for the second color is detected. If the synchronization signal Sync2 is detected ("YES" in Step S22), the operation proceeds to Step S23. Otherwise ("NO" in Step S22), the operation repeats Step S22.

Step S23 obtains the current counter value, and stores the counter value in the second time memory 703 as the initial value of the second time value t2. Any one of Steps S21, S22, and S23 may be performed by the counter 701 of FIG. 4.

Step S24 calculates a difference value Δt between the first time value t1 and the second time value t2. For example, as illustrated in FIG. 8, the difference value Δt may be obtained by subtracting the second time value t2 from the first time value t1. Step S24 may be performed by the calculator 712 of FIG. 4.

Step S25 determines whether the difference value Δt obtained in the previous step is less than the first reference value S1, i.e., 3T/4, stored in the first reference memory 706. If the difference value Δt is less than the first reference value S1 ("YES" in Step S25), the operation proceeds to Step S26. If the difference value Δt is equal to or greater than the first reference value S1 ("NO" in Step S25), the operation proceeds to Step S27. Step S25 may be performed by the second comparator 709 of FIG. 4. For example, in the example case illustrated in FIG. 8, since the difference value Δt is equal to or greater than 3T/4, the operation proceeds to Step S27.

Step S26 selects the synchronization signal Sync2, which is detected in Step S22, i.e., the firstly detected synchronization signal Sync2, to be a reference synchronization signal.

Step S27 selects the synchronization signal Sync2, which is detected after the detection of the firstly detected synchronization signal Sync2, i.e., the secondly detected synchronization signal Sync2, to be a reference synchronization signal. For example, in the exemplary case illustrated in FIG. 8, the synchronization signal Sync2 following the firstly detected synchronization signal Sync2 is selected as a reference synchronization signal for the second color. Steps S26 and S27 may be performed by the second comparator 709.

Step S28 updates the second time value t2 stored in the second time memory 703, by adding the value of the periodic cycle T to the initial value of the second time value t2. In this manner, the second time value t2 can accurately indicate a timing for starting second color image formation in the main scanning direction. For example, referring to FIG. 8, the value of the periodic cycle T is added to the second time value t2. Step S28 may be performed by the second adder 716.

Step S29 again calculates a difference value Δt between the first time value t1 and the second time value t2. In this manner, the updated second time value t2 may be reflected. Step S29 may be performed by the calculator 712 of FIG. 4.

Step S30 determines whether the difference value Δt obtained in Step S29 is less than a second reference value S2, which is stored in the second reference memory 707. If the difference value Δt is less than the second reference value S2 ("YES" in Step S30), the operation proceeds to Step S31. If the difference value Δt is equal to or greater than the second reference value S2 ("NO" in Step S30), the operation proceeds to Step S32. Step S30 may be performed by the second comparator 709 of FIG. 4.

In this example, the second reference value S2 is previously determined based on the number n of light beams emitted by the optical writing device 60 and the periodic cycle T of the synchronization signal Sync as indicated by the equation: $T/2n$. Since the light beam number n is equal to 2 in this example, the second reference value S2 can be expressed as T/4. For example, in the example case illustrated in FIG. 8, since the difference value Δt between the first time value t1 and the second time value t2 is less than T/4, the operation proceeds to Step S31.

Step S31 selects the first beam to be a reference beam. For example, as illustrated in FIG. 8, a first line ("L1" in FIG. 8) of the image data signal for the second color is written using the first beam (indicated by the dark color dot).

Step S32 selects the second beam to be a reference beam.

Step S33 updates the second time value t2, by adding a cycle fraction value to the current value of the second time period t2. In this example, the cycle fraction value may be obtained by dividing the periodic cycle T by the light beam number n, which is T/2. In this manner, the second time value t2 can accurately indicate a timing for starting second color image formation in the main scanning direction. Step S33 may be performed by the second adder 716.

Step S34 starts second color image formation at a timing determined by the reference synchronization signal selected in the previous step, using the reference beam selected in the previous step. For example, as illustrated in FIG. 8, when the secondly detected synchronization signal Sync2 is used as a reference synchronization signal and the first beam is used as a reference beam, the preceding line ("L1" in FIG. 8) of the image data signal for the second color is written using the first light beam (indicated by the dark color dot) at the timing p2. At the same time, the following line ("L2" in FIG. 8) of the image data signal for the second color is written using the second light beam (indicated by the white color dot). Step S34 may be performed by the output controller 711 of FIG. 4.

As a result, the second color latent image is formed on the surface of the image carrier 43. The second color latent image is then developed by the developer 44 into the second color toner image for further processing.

Referring now to FIGS. 8 and 11, the third operation of controlling a timing for starting third color image formation in the main scanning direction is explained according to an exemplary embodiment of the present invention.

Step S40 of FIG. 11 determines whether an image forming start signal Sf for the third color is detected. If the image forming start signal Sf is detected ("YES" in Step S40), the operation proceeds to Step S41. Otherwise ("NO" in Step S40), the operation repeats Step S40.

Step S41 sets a counter value to 0 to start counting the value of the third time period t3 based on the reference clock signal.

Step S42 determines whether a synchronization signal Sync3 for the third color is detected. If the synchronization signal Sync3 is detected ("YES" in Step S42), the operation proceeds to Step S43. Otherwise ("NO" in Step S42), the operation repeats Step S42.

Step S43 obtains the current counter value, and stores the counter value in the third time memory 704 as the initial value of the third time value t3. Any one of Steps S41, S42, and S43 may be performed by the counter 701 of FIG. 4.

Step S44 calculates a first average value ta1, which is the average of the first time value t1 and the second time value t2. The first average value ta1 may be stored in the first average memory 713 of FIG. 4.

Step S45 calculates a difference value Δt between the first average value ta1 and the third time value t3. For example, as illustrated in FIG. 8, the difference value Δt may be obtained by subtracting the third time value t3 from the first average value ta1. Step S24 may be performed by the calculator 712 of FIG. 4.

Step S46 determines whether the difference value Δt obtained in the previous step is less than the first reference value S1, i.e., 3T/4, stored in the first reference memory 706. If the difference value Δt is less than the first reference value S1 ("YES" in Step S46), the operation proceeds to Step S47. If the difference value Δt is equal to or greater than the first reference value S1 ("NO" in Step S46), the operation proceeds to Step S48. Step S46 may be performed by the second comparator 709 of FIG. 4. In the example case illustrated in FIG. 8, since the difference value Δt is less than 3T/4, the operation proceeds to Step S47.

Step S47 selects the synchronization signal Sync3, which is detected in Step S42, i.e., the firstly detected synchronization signal Sync3, to be a reference synchronization signal. For example, as illustrated in FIG. 8, the synchronization signal Sync3 following the image forming start signal Sf may be selected as a reference synchronization signal for the third color.

Step S48 selects the synchronization signal Sync3, which is detected after the detection of the firstly detected synchronization signal Sync3, i.e., the secondly detected synchronization signal Sync3, to be a reference synchronization signal. Steps S47 and S48 may be performed by the second comparator 709.

Step S49 updates the third time value t3 stored in the third time memory 704, by adding the value of the periodic cycle T to the initial value of the third time value t3. In this manner, the third time value t3 can accurately indicate a timing for starting third color image formation in the main scanning direction. Step S49 may be performed by the second adder 716.

Step S50 again calculates a difference value Δt between the first average value ta1 and the third time value t3. In this manner, the updated third time value t3 may be reflected. Step S50 may be performed by the calculator 712 of FIG. 4.

Step S51 determines whether the difference value Δt obtained in Step S50 is less than a second reference value S2, i.e., T/4, which is stored in the second reference memory 707. If the difference value Δt is less than the second reference value S2 ("YES" in Step S51), the operation proceeds to Step S52. If the difference value Δt is equal to or greater than the second reference value S2 ("NO" in Step S51), the operation proceeds to Step S53. In the example case illustrated in FIG. 8, since the difference value Δt is equal to or greater than T/4, the operation proceeds to Step S53. Step S51 may be performed by the second comparator 709 of FIG. 4.

Step S52 selects the first beam to be a reference beam.

Step S53 selects the second beam to be a reference beam. For example, as illustrated in FIG. 8, a first line ("L1" in FIG. 8) of the image data signal for the third color is written using the second beam (indicated by the white color dot). At this time, dummy data ("Du" in FIG. 8) is input to the output controller 711 as described referring to FIGS. 6 and 7B.

Step S54 updates the third time value t3, by adding the cycle fraction value, i.e., T/2, to the current value of the third time period t3. In this manner, the third time value t3 can accurately indicate a timing for starting third color image formation in the main scanning direction. Step S54 may be performed by the second adder 716.

Step S55 starts third color image formation at a timing determined by the reference synchronization signal selected in the previous step, using the reference beam selected in the previous step. For example, as illustrated in FIG. 8, when the firstly detected synchronization signal Sync3 is used as a reference synchronization signal and the second beam is used as a reference beam, the preceding line ("L1" in FIG. 8) of the image data signal for the third color is written using the second light beam (indicated by the white color dot) at the timing p3. At the timing corresponding to the secondly detected synchronization signal Sync3, the following line ("L2" in FIG. 8) of the image data signal for the third color is written using the first light beam (indicated by the black color dot). Step S55 may be performed by the output controller 711 of FIG. 4.

As a result, the third color latent image is formed on the surface of the image carrier 43. The third color latent image is then developed by the developer 44 into the third color toner image for further processing.

Referring now to FIGS. 8 and 12, the fourth operation of controlling a timing for starting fourth color image formation in the main scanning direction is explained according to an exemplary embodiment of the present invention.

Step S60 of FIG. 12 determines whether an image forming start signal Sf for the fourth color is detected. If the image forming start signal Sf is detected ("YES" in Step S60), the operation proceeds to Step S61. Otherwise ("NO" in Step S60), the operation repeats Step S60.

Step S61 sets a counter value to 0 to start counting the value of the fourth time period t4 based on the reference clock signal.

Step S62 determines whether a synchronization signal Sync4 for the fourth color is detected. If the synchronization signal Sync4 is detected ("YES" in Step S62), the operation proceeds to Step S63. Otherwise ("NO" in Step S62), the operation repeats Step S62.

Step S63 obtains the current counter value, and stores the counter value in the fourth time memory 705 as the initial value of the fourth time value t4. Any one of Steps S61, S62, and S63 may be performed by the counter 701 of FIG. 4.

Step S64 calculates a second average value ta2, which is the average of the first time value t1, the second time value t2, and the third time value t3. The second average value ta2 may be stored in the second average memory 714 of FIG. 4.

Step S65 calculates a difference value $\Delta t$ between the second average value ta2 and the fourth time value t4. For example, as illustrated in FIG. 8, the difference value $\Delta t$ may be obtained by subtracting the fourth time value t4 from the second average value ta2. Step S65 may be performed by the calculator 712 of FIG. 4.

Step S66 determines whether the difference value $\Delta t$ obtained in the previous step is less than the first reference value S1, i.e., 3T/4, stored in the first reference memory 706. If the difference value $\Delta t$ is less than the first reference value S1 ("YES" in Step S66), the operation proceeds to Step S67. If the difference value $\Delta t$ is equal to or greater than the first reference value S1 ("NO" in Step S66), the operation proceeds to Step S68. Step S66 may be performed by the second comparator 709 of FIG. 4. In the example case illustrated in FIG. 8, since the difference value $\Delta t$ is less than 3T/4, the operation proceeds to Step S67.

Step S67 selects the synchronization signal Sync4, which is detected in Step S62, i.e., the firstly detected synchronization signal Sync4, to be a reference synchronization signal. For example, as illustrated in FIG. 8, the synchronization signal Sync4 following the image forming start signal Sf may be selected as a reference synchronization signal for the fourth color.

Step S68 selects the synchronization signal Sync4, which is detected after the detection of the firstly detected synchronization signal Sync4, i.e., the secondly detected synchronization signal Sync4, to be a reference synchronization signal. Steps S67 and S68 may be performed by the second comparator 709.

Step S69 updates the fourth time value t4 stored in the fourth time memory 705, by adding the value of the periodic cycle T to the initial value of the fourth time value t4. In this manner, the fourth time value t4 can accurately indicate a timing for starting fourth color image formation in the main scanning direction. Step S69 may be performed by the second adder 716.

Step S70 again calculates a difference value $\Delta t$ between the second average value ta2 and the fourth time value t4. In this manner, the updated fourth time value t4 may be reflected. Step S70 may be performed by the calculator 712 of FIG. 4.

Step S71 determines whether the difference value $\Delta t$ obtained in Step S70 is less than a second reference value S2, i.e., T/4, which is stored in the second reference memory 707. If operation proceeds to Step S72. If the difference value $\Delta t$ is equal to or greater than the second reference value S2 ("NO" in Step S71), the operation proceeds to Step S73. In the example case illustrated in FIG. 8, since the difference value $\Delta t$ is less than T/4, the operation proceeds to Step S72. Step S71 may be performed by the second comparator 709 of FIG. 4.

Step S72 selects the first beam to be a reference beam. For example, as illustrated in FIG. 8, a first line ("L1" in FIG. 8) of the image data signal for the fourth color may be written using the first beam (indicated by the black color dot).

Step S73 selects the second beam to be a reference beam.

Step S74 updates the fourth time value t4, by adding the cycle fraction value of the periodic cycle T, i.e., T/2, to the current value of the fourth time period t4. In this manner, the fourth time value t4 can accurately indicate a timing for starting fourth color image formation in the main scanning direction. Step S74 may be performed by the second adder 716.

Step S75 starts fourth color image formation at a timing determined by the reference synchronization signal selected in the previous step, using the reference beam selected in the previous step. For example, as illustrated in FIG. 8, when the firstly detected synchronization signal Sync4 is used as a reference synchronization signal and the first beam is used as a reference beam, the preceding line ("L1" in FIG. 8) of the image data signal for the fourth color is written using the first light beam (indicated by the black color dot) at the timing p4. At the same time, the following line ("L2" in FIG. 8) of the image data signal for the fourth color is written using the second light beam (indicated by the white color dot). Step S75 may be performed by the output controller 711 of FIG. 4.

As a result, the fourth color latent image is formed on the surface of the image carrier 43. The fourth color latent image is then developed by the developer 44 into the fourth color toner image for further processing.

Figure 13A:
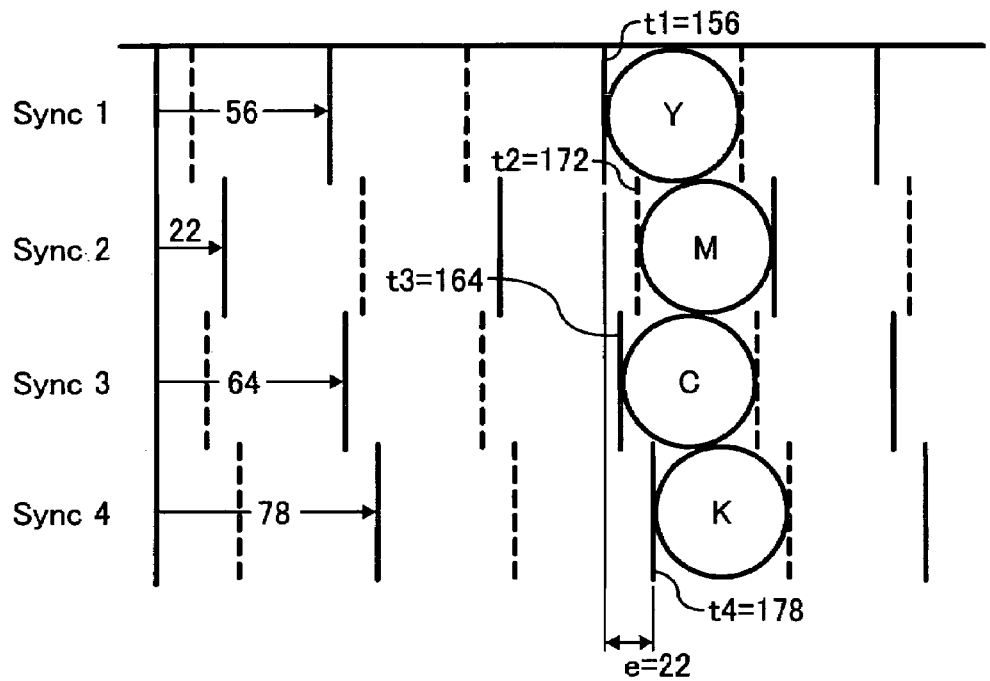
FIG. 13A is an illustration for explaining a timing for starting image formation, determined by the timing controller of FIG. 4 according to an exemplary embodiment of the present invention.
Figure 13B:
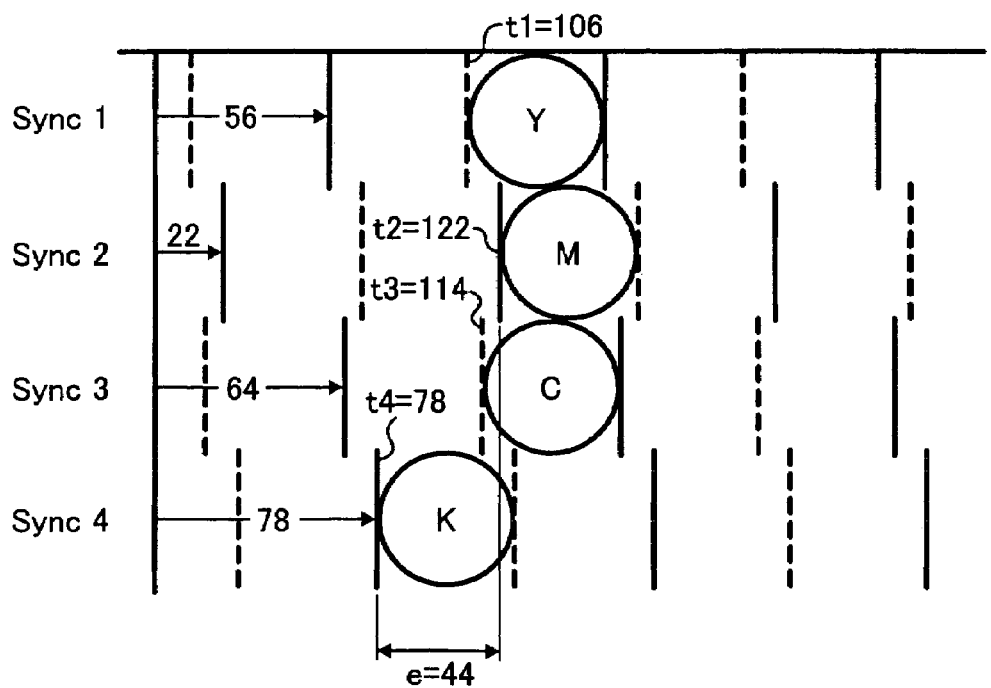
FIG. 13B is an illustration for explaining a timing for starting image formation, determined by a background image forming apparatus.

By sequentially performing the first to fourth operations illustrated in FIGS. 9 to 12, variance in timing for starting image formation among different colors may be suppressed as indicated by the comparison between FIG. 13A and FIG. 13B.

Referring to FIGS. 13A and 13B, a synchronization signal Sync1 for a first color is firstly detected at the timing of 56 after the detection of an image forming start signal. A synchronization signal Sync2 for a second color is firstly detected at the timing of 22 after the detection of an image forming start signal. A synchronization signal Sync3 for a third color is firstly detected at the timing of 64 after the detection of an image forming start signal. A synchronization signal Sync4 for a fourth color is firstly detected at the timing of 78 after the detection of an image forming start signal. In this example, the synchronization signals Sync1, Sync2, Sync3, and Sync3 each have the periodic cycle T of 100. Further, the number of beams is assumed to be equal to 2. FIG. 13A illustrates an example case in which the first to fourth operations illustrated in FIGS. 9 to 12 are performed to control a timing for starting image formation. FIG. 13B illustrates an example case in which such operations illustrated in FIGS. 9 to 12 are not performed.

Referring to FIG. 13B, a first time value t1, a second time value t2, a third time value t3, and a fourth time value t4 are determined to be 106, 122, 114, and 78, respectively. Since the maximum value and the minimum value of these time values are, respectively, 122 and 78, a fluctuation range e of 44 is obtained.

Referring to FIG. 13A, since the first time value t1=56 is less than 3T/4=75, first color image formation is delayed for one periodic cycle. Accordingly, the updated first time value t1 of 156 is obtained by adding T=100.

The difference value Δt between the first time value t1=156 and the second time value t2=22 is 132, which is greater than the 3T/4=75. Thus, the secondly detected synchronization signal is selected, while updating the second time value t2=22 to 122. The difference value Δt between the first time value t1=156 and the second time value t2=122 is 34, which is greater than T/4=25. Thus, the second beam is selected, while updating the second time value t2=122 to 172. In a substantially similar manner, a third time value t3=164 and a fourth time value t4=178 are obtained.

Since the maximum value and the minimum value of these time values are, respectively, 178 and 156, a fluctuation range e of 22 is obtained, which is less than the fluctuation range of FIG. 13B. In this example, the fluctuation range indicates the variance in timing for starting image formation among different colors.

The above-described operation of controlling a timing for starting image formation in the main scanning direction may be performed in various other ways.

In one example, the value of the periodic cycle T may be different for each of the first, second, third, and fourth colors. Accordingly, the first reference value S1 or the second reference value S2 may differ among the first, second, third, and fourth colors.

As described above referring to FIG. 2, since the light detector 65 outputs a synchronization signal upon detecting a light beam deflected from one surface of the deflector 63, the synchronization signal may vary depending on the surface of the deflector 63 directing the light beam. For example, if the deflector 63 has six surfaces as illustrated in FIG. 2, six different values may be obtained for the periodic cycle T of the synchronization signal. This fluctuation in periodic cycle T may influence the first comparison result or the second comparison result, by chancing the first reference value S1 or the second reference value S2.

Figure 14A:
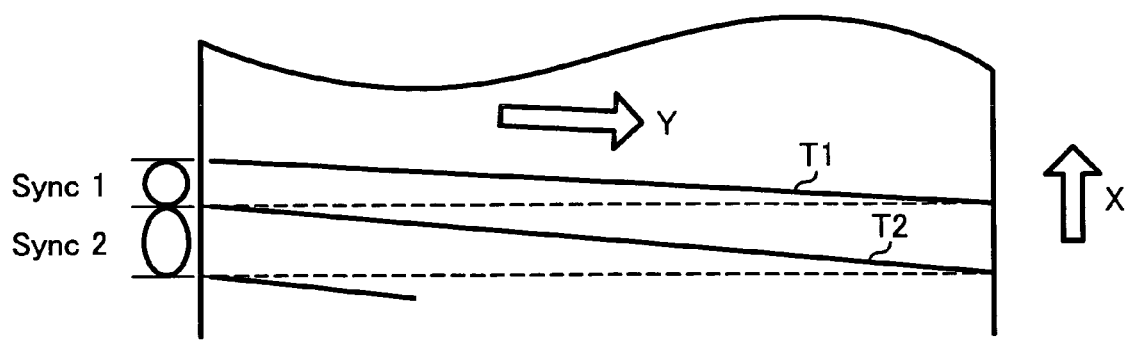
FIG. 14A is an example illustration of light beams, each having a different value of a periodic cycle.
Figure 14B:
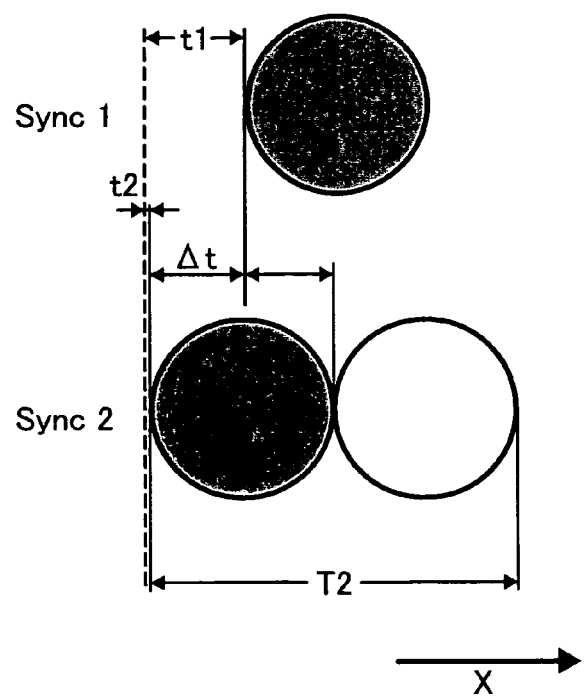
FIG. 14B is an illustration for explaining operation of controlling a timing for starting image formation, when light beams each have a different value of a periodic cycle.

FIGS. 14A and 14B illustrates an exemplary case in which the periodic cycle T fluctuates between 96 and 104. As shown in FIG. 14A, a synchronization signal Sync1 for a first color has a periodic cycle T1 of 96, and a synchronization signal Sync2 for a second color has a periodic cycle T2 of 104. With the smaller periodic cycle value T1, a light beam forms a light spot having a small diameter. With the larger periodic cycle value T2, a light beam forms a light spot having a large diameter.

Referring to FIG. 14B, a first time value t1 is 26, while the difference value Δt between the first time value t1 and a second time value t2 is 25. The different value of the periodic cycle T can change a third comparison result, which determines whether the first beam should be used as a reference beam.

For example, if the value of the periodic cycle T1=96 is used, the difference value Δt=25 is greater than the second reference value S2=96/4=24. As a result, the second beam is selected as a reference beam. In another example, if the value of the periodic cycle T2=104 is used, the difference value Δt=25 is less than the second reference value S2=104/4 =27. As a result, the first beam is selected as a reference beam.

In light of the above, in one example, an average periodic cycle value Ta may be obtained by averaging a plurality of periodic cycle values obtainable from one rotation of the deflector 63. In the example case illustrated in FIG. 14B, the periodic cycle value Ta of 100 is obtained by averaging the periodic cycle values T1 and T2. Since the difference value Δt=25 is equal to the second reference value S2=Ta/4=100/4=25, the second beam is selected.

In another example, the value of the periodic cycle T may be changed according to the surface of the deflector 63, which will start image formation. For example, the values of the periodic cycle T may be stored in a corresponding manner with the respective surfaces of the deflector 63. At the time when the image forming start signal is output, the periodic cycle value corresponding to the surface of the deflector 63, which emits a light beam, is selected.

Figure 15:
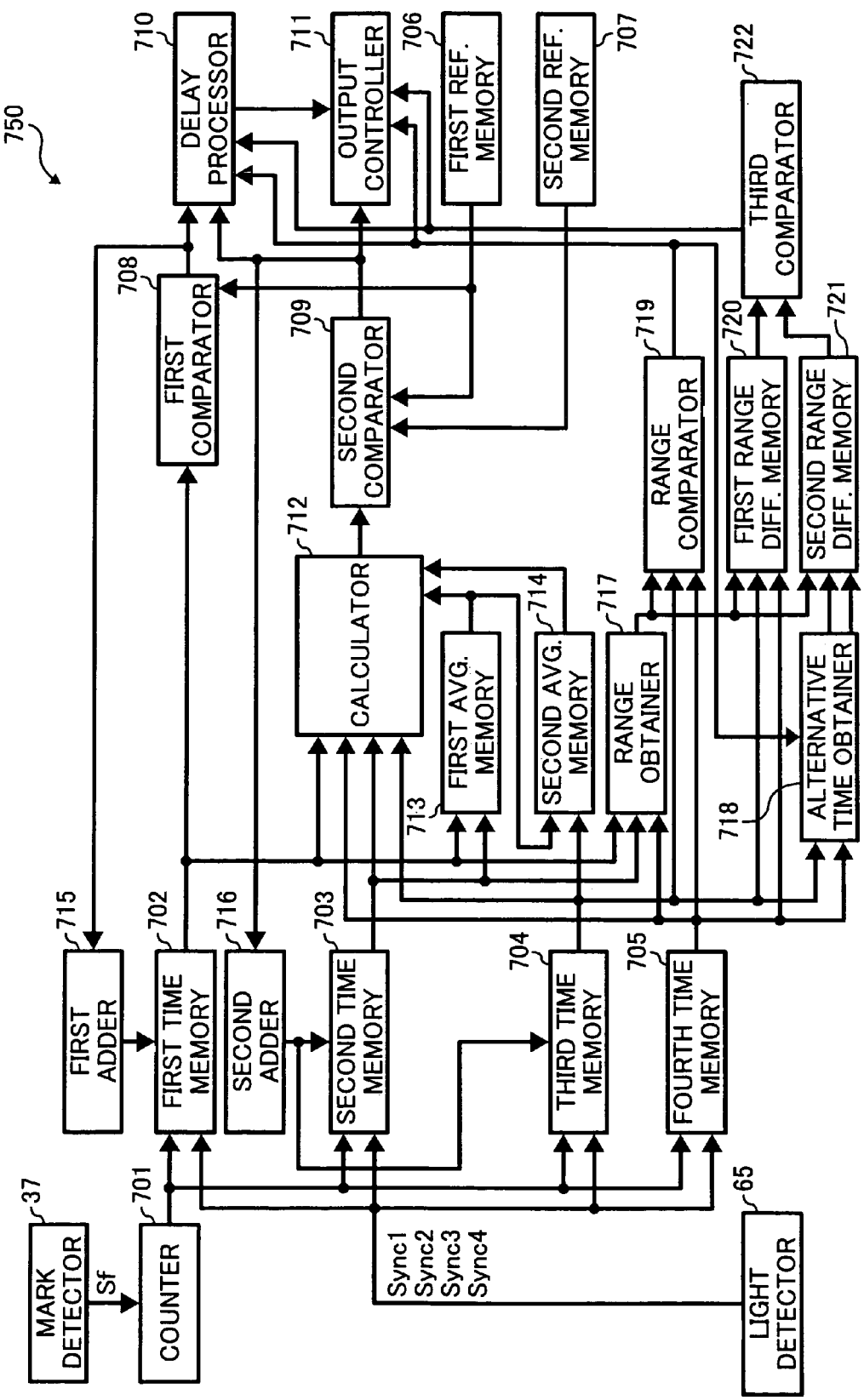
FIG. 15 is a schematic block diagram illustrating the functional structure of a timing controller incorporated in the image forming apparatus of FIG. 1, according to an exemplary embodiment of the present invention.

Referring now to FIG. 15, a timing controller 750, which may be incorporated in the controller 70 of FIG. 1 in replacement of the timing controller 700 of FIG. 4, is explained according to an exemplary embodiment of the present invention. The timing controller 750 of FIG. 15 is substantially similar in functional structure to the timing controller 700 of FIG. 4. The differences include the addition of a range obtainer 717, an alternative time obtainer 718, a range comparator 719, a first range difference memory 720, a second range difference memory 721, and a third comparator 722.

The range obtainer 717 obtains a fluctuation range, which indicates the variance in timing for starting image formation. In one example, the range obtainer 717 obtains a first fluctuation range of the first time value t1 and the second time value t2, by specifying a maximum value and a minimum value of the first and second time values t1 and t2. In another example, the range obtainer 717 obtains a second fluctuation range of the first time value t1, the second time value t2, and the third time value t3, by specifying a maximum value and a minimum value of the first, second, and third time values t1, t2, and t3.

The range comparator 719 determines whether the time value that is determined based on the second or third comparison result of the second comparator 709 ("determined time value") is within the fluctuation range obtained by the range obtainer 717 to output a fourth comparison result. When the fourth comparison result indicates that the determined time value is within the fluctuation range, the range comparator 719 instructs any one of the delay processor 710 and the output controller 711 to proceed with the determined time value. When the fourth comparison result indicates that the determined time value is out of the fluctuation range, the range comparator 709 instructs any one of the delay processor 710 and the output controller 711 to wait for a fifth comparison result output from the third comparator 722. In one example, the range comparator 719 determines whether the determined third time value t3 is less than the minimum value of the first fluctuation range, or greater than the maximum value of the first fluctuation range. In another example, the range comparator 719 determines whether the determined fourth time value t4 is less than the minimum value of the second fluctuation range, or greater than the maximum value of the second fluctuation range.

The first range difference memory 720 obtains a first difference range value between the determined time value and either one of the maximum value and the minimum value of the fluctuation range, based on the fourth comparison result. In one example, when the fourth comparison result indicates that the determined time value is less than the minimum value of the fluctuation range, the first range difference memory 720 obtains a first range difference value between the determined time value and the minimum value of the fluctuation range. In another example, when the fourth comparison result indicates that the determined time value is greater than the maximum value of the fluctuation range, the first range difference memory 720 obtains a first range difference value between the determined time value and the maximum value of the fluctuation range.

The alternative time obtainer 718 adds or subtracts a predetermined value to or from the determined time value to obtain an alternative time value, based on the fourth comparison result. In one example, when the fourth comparison result indicates that the determined time value is less than the minimum value of the fluctuation range, the alternative time obtainer 718 adds a predetermined value to the determined time value to obtain an alternative time value. In another example, when the fourth comparison result indicates that the determined time value is greater than the maximum value of the fluctuation range, the alternative time obtainer 718 subtracts a predetermined value from the determined time value to obtain an alternative time value.

The second range difference memory 721 obtains a second range difference value between the alternative time value and either one of the maximum value and the minimum value of the fluctuation range. In one example, when the fourth comparison result indicates that the determined time value is less than the minimum value of the fluctuation range, the second range difference memory 721 obtains a second range difference value between the alternative time value and the minimum value of the fluctuation range. In another example, when the fourth comparison result indicates that the determined time value is greater than the maximum value of the fluctuation range, the first range difference memory 720 obtains a second range difference value between the alternative time value and the maximum value of the fluctuation range.

The third comparator 722 compares the first range difference value and the second range difference value to output the fifth comparison result. When the fifth comparison result indicates that the first range difference value is less than the second range difference value, the third comparator 722 instructs any one of the delay processor 710 and the output controller 711 to proceed with the determined time value. When the fifth comparison result indicates that the second range difference value is less than the first range difference value, the third comparator 722 instructs any one of the delay processor 710 and the output processor 711 to start image formation using the alternative time value. At this time, the time value is updated to be equal to the alternative time value.

With the addition of above-described functions, the timing controller 750 is capable of further reducing a fluctuation range, by determining whether the determined time value is more preferable than the alternative time value. For example, in addition to the first, second, third, and fourth operations illustrated in FIGS. 9 to 12, the timing controller 750 may perform any one of operation illustrated in FIG. 16 and operation illustrated in FIG. 17.

Figure 16:
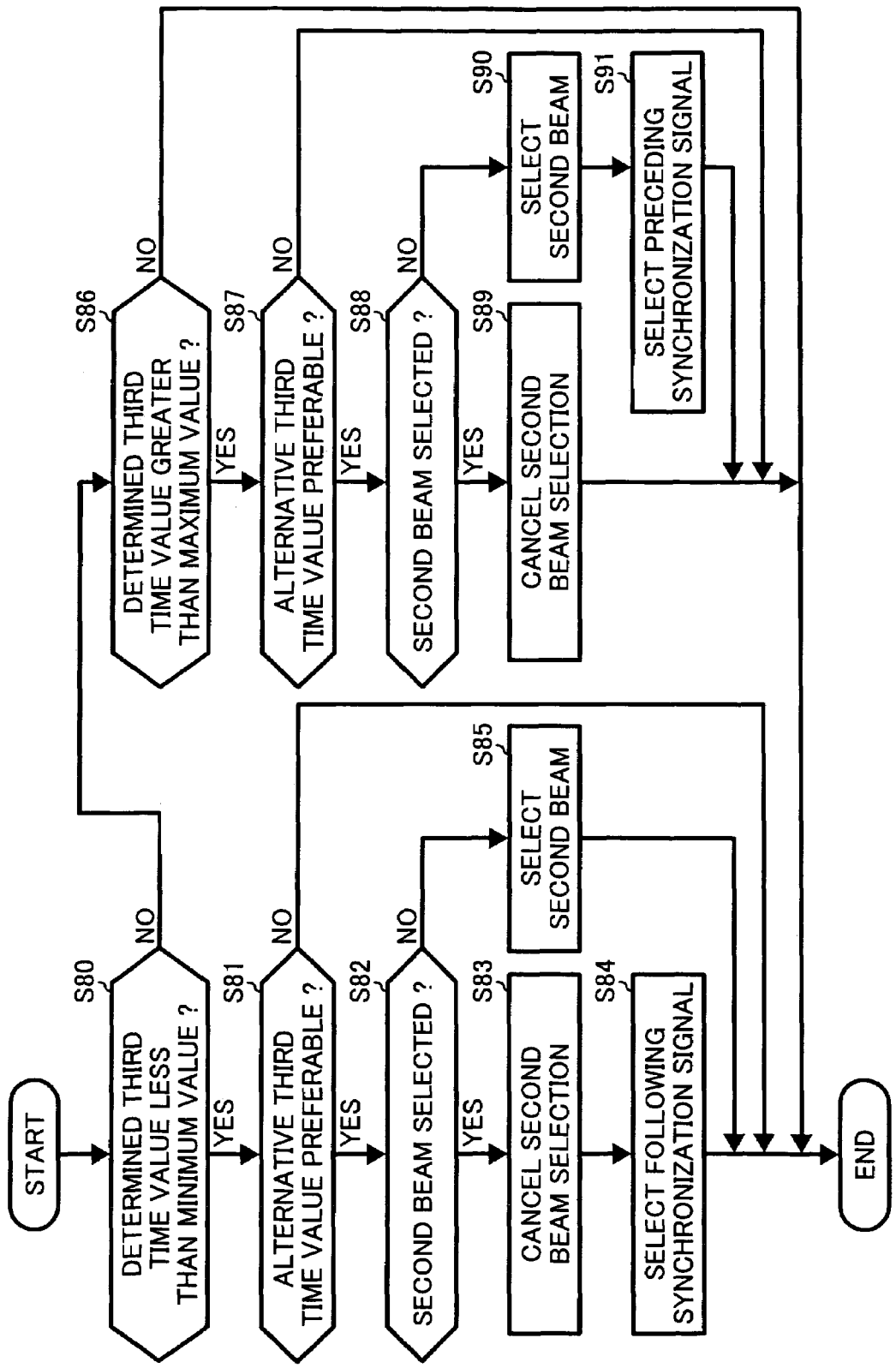
FIG. 16 is a flowchart illustrating operation of controlling a fluctuation range according to an exemplary embodiment of the present invention.

Referring now to FIG. 16, operation of determining whether the determined third time value is preferable, performed by the timing controller 750 of FIG. 15, is explained according to an exemplary embodiment of the present invention. The operation of FIG. 16 is preformed in parallel with the operation of FIG. 11, preferably after Step S52 or S54 but before Step S55.

Step S80 obtains a minimum value of a fluctuation range between the first time value t1 and the second time value t2, and compares the determined third time value t3 with the minimum value. When the determined third time value t3 is less than the minimum value ("YES" in Step S80), the operation proceeds to Step S81. When the determined third time value t3 is greater than the minimum value ("NO" in Step S80), the operation proceeds to Step S86. Step S80 may be performed by the range obtainer 717 and the range comparator 719 of FIG. 15.

Step S81 determines whether an alternative third time value t3, which is greater than the determined third time value t3, is preferable. If the alternative third time value t3 is more preferable than the determined third time value t3 ("YES" in Step S81), the operation proceeds to Step S82. If the determined third time value t3 is more preferable than the alternative third time value t3 ("NO" in Step S81), the operation ends.

For example, the first range difference memory 720 obtains a first difference range value between the determined third time value t3 and the minimum value of the fluctuation range. The alternative time obtainer 718 adds a predetermined value, such as the fraction cycle value of T/2, to obtain the alternative third time value t3. The second range difference memory 721 obtains a second range difference value between the alternative third time value t3 and the minimum value of the fluctuation range. The third comparator 722 compares the first range difference value and the second range difference value. If the second range difference value is less than the first range difference value, the alternative third time value t3 is determined to be more preferable. It the second range difference value is greater than the first range difference value, the determined third time value t3 is determined to be more preferable.

Step S82 determines whether the second beam has been selected as a reference beam based on the third comparison result of the second comparator 709 in Step S53 of FIG. 11. If the second beam has been selected ("YES" in Step S82), the operation proceeds to Step S83. If the second beam has not been selected, i.e., the first beam has been selected ("NO" in Step S82), the operation proceeds to Step S85.

Step S83 cancels the second beam selection. As a result, the first beam is reselected as a reference beam.

Step S84 selects a synchronization signal Sync3, which follows the currently selected synchronization signal Sync3, and the operation ends. At the same time, the third time value t3 is updated to reflect the changes.

Step S85 selects the second beam as a reference beam, and the operation ends. At the same time, the third time value t3 is updated to reflect the changes.

Step S86 obtains a maximum value of the fluctuation range between the first time value t1 and the second time value t2, and compares the determined third time value t3 with the maximum value. When the determined third time value t3 is greater than the maximum value ("YES" in Step S86), the operation proceeds to Step S87. When the determined third time value t3 is less than the maximum value ("NO" in Step S86), the operation ends. Step S86 may be performed by the range obtainer 717 and the range comparator 719.

Step S87 determines whether an alternative third time value t3, which is less than the determined third time value t3, is preferable. If the alternative third time value t3 is more preferable than the determined third time value t3 ("YES" in Step S87), the operation proceeds to Step S88. If the determined third time value t3 is more preferable than the determined third time value t3 ("NO" in Step S87), the operation ends.

For example, the first range difference memory 720 obtains a first difference range value between the determined third time value t3 and the maximum value of the fluctuation range.

The alternative time obtainer 718 subtracts a predetermined value, such as the cycle fraction value T/2, from the determined third time value t3 to obtain the alternative third time value t3. The second range difference memory 721 obtains a second range difference value between the alternative third time value t3 and the maximum value of the fluctuation range. The third comparator 722 compares the first range difference value and the second range difference value. If the second range difference value is less than the first range difference value, the alternative third time value t3 is determined to be more preferable. If the second range difference value is greater than the first range difference value, the determined third time value t3 is determined to be more preferable.

Step S88 determines whether the second beam has been selected as a reference beam based on the third comparison result of the second comparator 709 in Step S53 of FIG. 11. If the second beam has been selected ("YES" in Step S88), the operation proceeds to Step S89. If the second beam has not been selected, i.e., the first beam has been selected ("NO" in Step S88), the operation proceeds to Step S90.

Step S89 cancels the second beam selection. As a result, the first beam is reselected as a reference beam.

Step S90 selects the second beam as a reference beam.

Step S91 selects a synchronization signal Sync3, which precedes the currently selected synchronization signal Sync3, and the operation ends. At the same time, the third time value t3 is updated to reflect the changes.

Figure 17:
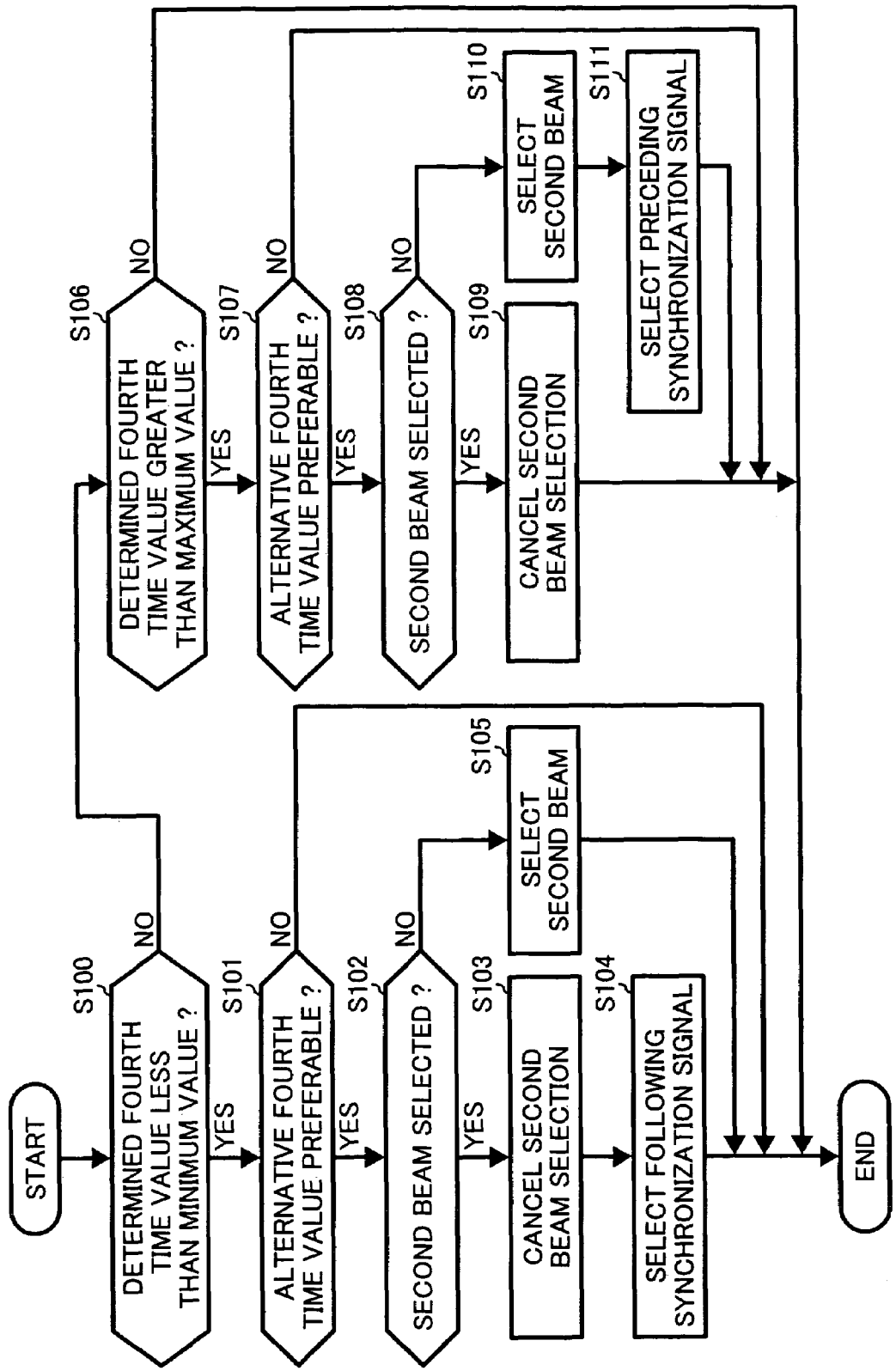
FIG. 17 is a flowchart illustrating operation of controlling a fluctuation range according to an exemplary embodiment of the present invention.

Referring now to FIG. 17, operation of determining whether the determined fourth time value is preferable, performed by the timing controller 750 of FIG. 15, is explained according to an exemplary embodiment of the present invention. The operation of FIG. 17 is performed in parallel with the operation of FIG. 12, preferably after Step S72 or S73 but before step S75.

Step S100 obtains a minimum value of a fluctuation range of the first time value t1, the second time value t2, and the third time value t3, and compares the determined fourth time value t4 with the minimum value. When the determined fourth time value t4 is less than the minimum value ("YES" in Step S100), the operation proceeds to Step S101. When the determined fourth time value t4 is greater than the minimum value ("NO" in Step S100), the operation proceeds to Step S206. Step S100 may be performed by the range obtainer 717 and the range comparator 719 of FIG. 15.

Step S101 determines whether an alternative fourth time value t4, which is greater than the determined fourth time value t4, is preferable. If the alternative fourth time value t4 is more preferable than the determined fourth time value t4 ("YES" in Step S101), the operation proceeds to Step S102. If the determined fourth time value t4 is more preferable than the alternative fourth time value t4 ("NO" in Step S101), the operation ends. Step S101 may be performed in a substantially similar manner as described referring to Step S81 of FIG. 16.

Step S102 determines whether the second beam has been selected as a reference beam based on the third comparison result of the second comparator 709 in Step S73 of FIG. 12. If the second beam has been selected ("YES" in Step S102), the operation proceeds to Step S103. If the second beam has not been selected, i.e., the first beam has been selected ("NO" in Step S102), the operation proceeds to Step S105.

Step S103 cancels the second beam selection. As a result, the first beam is reselected as a reference beam.

Step S104 selects a synchronization signal Sync4, which follows the currently selected synchronization signal Sync4, and the operation ends. At the same time, the fourth time value t4 is updated to reflect the changes.

Step S105 selects the second beam as a reference beam, and the operation ends. At the same time, the fourth time value t4 is updated to reflect the changes.

Step S106 obtains a maximum value of the fluctuation range of the first time value t1, the second time value t2, and the third time value t3, and compares the determined fourth time value t4 with the maximum value. When the determined fourth time value t4 is greater than the maximum value ("YES" in Step S106), the operation proceeds to Step S107. When the determined fourth time value t4 is less than the maximum value ("NO" in Step S106), the operation ends. Step S106 may be performed by the range obtainer 717 and the range comparator 719.

Step S107 determines whether an alternative fourth time value t4, which is less than the determined fourth time value t4, is preferable. If the alternative fourth time value t4 is more preferable than the determined fourth time value t4 ("YES" in Step S107), the operation proceeds to Step S108. If the determined fourth time value t4 is more preferable than the determined fourth time value t4 ("NO" in Step S107), the operation ends. Step S107 may be performed in a substantially similar manner as described referring to Step S87 of FIG. 16.

Step S108 determines whether the second beam has been selected as a reference beam based on the third comparison result of the second comparator 709 in Step S73 of FIG. 12. If the second beam has been selected ("YES" in Step S108), the operation proceeds to Step S109. If the second beam has not been selected, i.e., the first beam has been selected ("NO" in Step S108), the operation proceeds to Step S110.

Step S109 cancels the second beam selection. As a result, the first beam is reselected as a reference beam.

Step S90 selects the second beam as a reference beam.

Step S91 selects a synchronization signal Sync4, which precedes the currently selected synchronization signal Sync4, and the operation ends. At the same time, the fourth time value t4 is updated to reflect the changes.

Figure 18A:
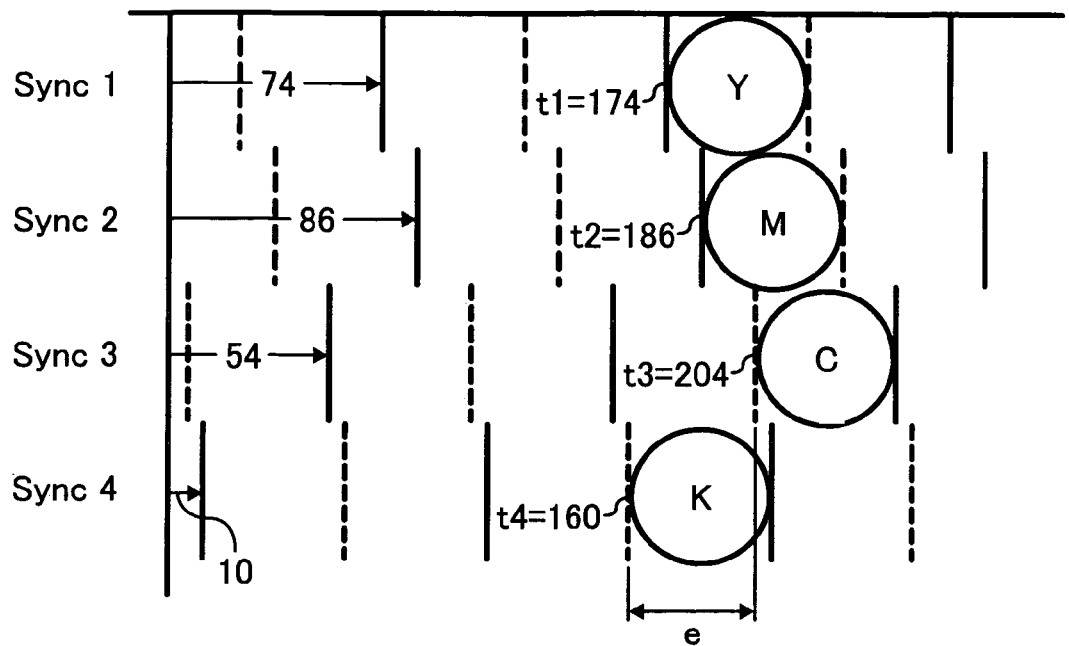
FIG. 18A is an illustration for explaining a timing for starting image formation, determined by the timing controller of FIG. 4 according to an exemplary embodiment of the present invention.
Figure 18B:
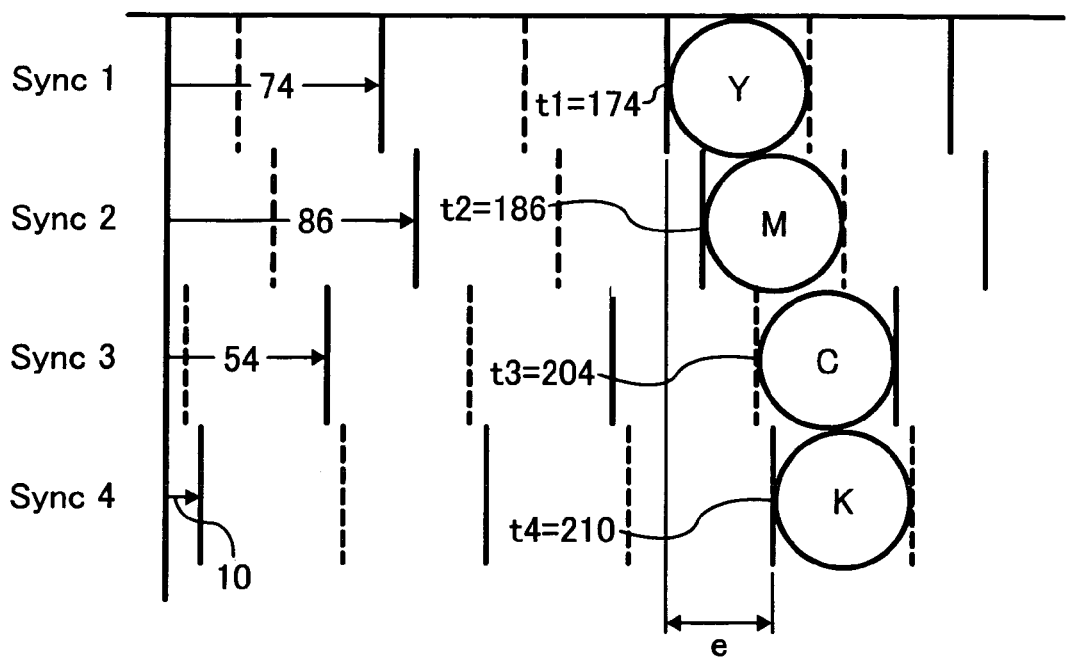
FIG. 18B is an illustration for explaining a timing for starting image formation, determined by the timing controller of FIG. 15 according to an exemplary embodiment of the present invention.

By performing the operations illustrated in FIGS. 16 and 17, variance in timing for starting image formation among different colors may be further suppressed as indicated by the comparison between FIG. 18A and FIG. 18B.

Referring to FIGS. 18A and 18B, a synchronization signal Sync1 for a first color is firstly detected at the timing of 74 after the detection of an image forming start signal. A synchronization signal Sync2 for a second color is first detected at the timing of 86 after the detection of an image forming start signal. A synchronization signal Sync3 for a third color is firstly detected at the timing of 54 after the detection of an image forming start signal. A synchronization signal Sync4 for a fourth color is firstly detected at the timing of 10 after the detection of an image forming start signal. In this example, the synchronization signals Sync1, Sync2, Sync3, and Sync3 each have the periodic cycle T of 100. Further, the number of beams is assumed to be equal to 2. FIG. 18A illustrates an example case in which the first to fourth operations illustrated in FIGS. 9 to 12 are performed to control a timing for starting image formation. FIG. 18B illustrates an example case in which the operations illustrated in FIGS. 16 and 17 are performed to reduce a fluctuation range, in addition to the first to fourth operations illustrated in FIGS. 9 to 12.

Referring to FIG. 18A, a first time value t1, a second time value t2, a third time value t3, and a fourth time value t4 are determined to be 174, 186, 204, and 160, respectively. Since the maximum value and the minimum value of these time values are, respectively, 160 and 204, a fluctuation range e of 44 is obtained.

Referring to FIG. 18B, a first time value t1, a second time value t2, a third time value t3, and a fourth time value t4 are determined to be 174, 186, 204, and 210, respectively. Since the maximum value and the minimum value of these time values are, respectively, 174 and 210, a fluctuation range e of 36 is obtained, which is less than the fluctuation range of FIG. 18A.

Further, any one of the above-described and other operations of controlling a timing for starting image formation in the main scanning direction may be performed in various other ways.

In one example, a timing for starting image formation for a first color may not be considered when determining a timing for starting image formation for a third or fourth color. In this example, the first color is previously determined by default or according to user's preference.

Figure 19A:
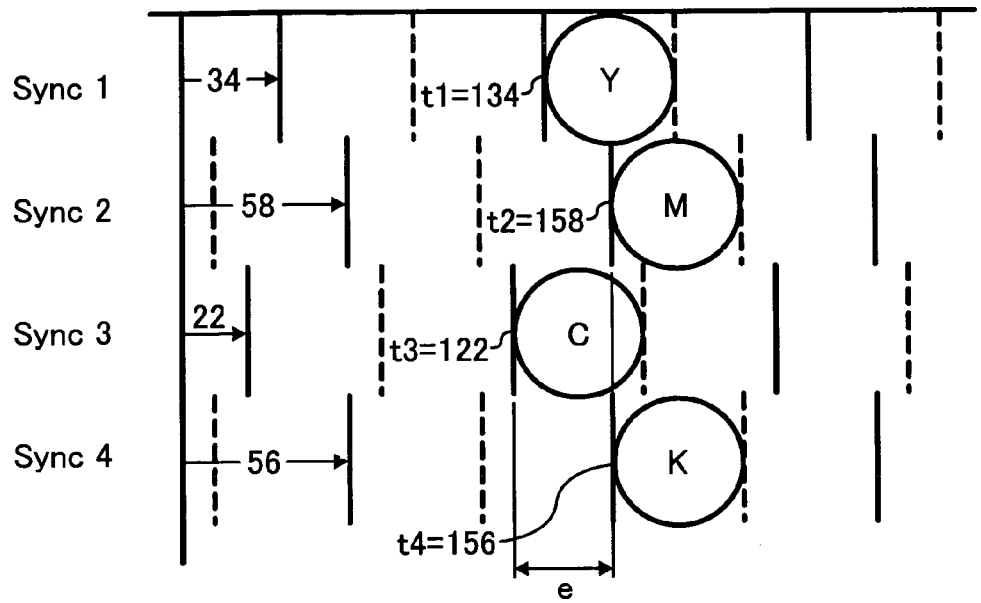
FIG. 19A is an illustration for explaining a timing for starting image formation, determined by the timing controller of FIG. 4 according to an exemplary embodiment of the present invention.
Figure 19B:
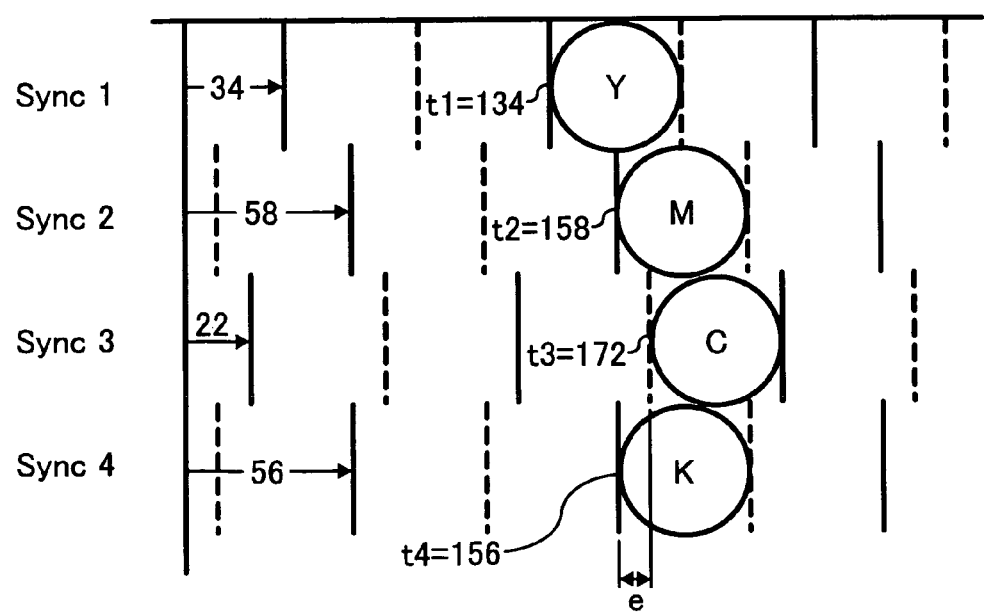
FIG. 19B is an illustration for explaining a timing for starting image formation, determined by a timing controller according to an exemplary embodiment of the present invention.

As illustrated in FIG. 19B, in one example, the first color is previously determined to be a color, which is less recognizable to the human eye, such as the yellow color. If the timing for starting image formation for the yellow color is not considered, the overall fluctuation range, which indicates the variance in timing for starting image formation among the other three colors, may be further reduced.

Referring to FIGS. 19A and 19B, a synchronization signal Sync1 for a first color is firstly detected at the timing of 34 after the detection of an image forming start signal. A synchronization signal Sync2 for a second color is firstly detected at the timing of 58 after the detection of an image forming start signal. A synchronization signal Sync3 for a third color is firstly detected at the timing of 22 after the detection of an image forming start signal. A synchronization signal Sync4 for a fourth color is firstly detected at the timing of 56 after the detection of an image forming start signal. In this example, the synchronization signals Sync1, Sync2, Sync3, and Sync3 each have the periodic cycle T of 100. The number of beams is assumed to be equal to 2. FIG. 19A illustrates an example case in which the first color is considered when controlling a timing for starting image formation for the third or fourth color. FIG. 19B illustrates an example case in which the first color is not considered when controlling a timing for starting image formation for the third or fourth color.

Referring to FIG. 19A, a first time value t1, a second time value t2, a third time value t3, and a fourth time value t4 are determined to be 134, 158, 122, and 156, respectively. Since the maximum value and the minimum value of the first to fourth time values are, respectively, 122 and 158, a fluctuation range of 36 is obtained.

Referring to FIG. 19B, a first time value t1 and a second time value t2 are respectively determined in a substantially similar manner as the example case illustrated in FIG. 19A. When determining the third time value t3 or the fourth time value t4, the first time value t1, i.e., a timing for starting yellow color image formation, is not considered.

In the example case illustrated in FIG. 19A, as described above referring to FIG. 11, the third time value t3 is determined by comparing the difference value Δt between the first average value ta1 and the third time value t3, with the first reference value S1 or the second reference value S2. However, in the example case illustrated in FIG. 19B, the third time value t3 is determined by comparing the difference value Δt between the second time value t2 and the third time value t3, with the first reference value S1 or the second reference value S2. For example, as illustrated in FIG. 19B, the difference value Δt between the second time value t2=158 and the third time value t3=22 is 136, which is greater than the first reference value S1=3T/4=75. As a result, the secondly detected synchronization signal Sync3 is selected as a reference signal for the third color. Further, the difference value Δt between the second time value t2=158 and the updated third time value t3=122 is 36, which is greater than the second reference value S2=T/4=25. As a result, the second beam is selected as a reference beam. The third time value t3 is determined to be 172.

In the example case illustrated in FIG. 19A, as described above referring to FIG. 12, the fourth time value t4 is determined by comparing the difference value Δt between the second average value ta2 and the fourth time value t4, with the first reference value S1 or the second reference value S2. However, in the example case illustrated in FIG. 19B, a third average value ta3 between the second time value t2 and the third time value t3 is obtained. The third average value ta3 may be stored in a third average memory, which may be provided with the timing controller 700 of FIG. 4 in replace of the first average memory 713 or the second average memory 714. The fourth time value t4 is determined by comparing the difference value Δt between the third average value ta3 and the fourth time value t4, with the first reference value S1 or the second reference value S2. For example, as illustrated in FIG. 19B, the difference value Δt between the third average value ta3=(158+172)/2=165 and the fourth time value t4=56 is 109, which is greater than the first reference value S1=3T/4=75. As a result, the secondly detected synchronization signal Sync4 is selected as a reference signal for the fourth color. Further, the difference value Δt between the third average value ta3=165 and the updated fourth time value t4=156 is 9, which is less than the second reference value S2=T/4=25. As a result, the first beam is selected as a reference beam. The fourth time value t4 is determined to be 156.

Still referring to FIG. 19B, since the maximum value and the minimum value of the first to fourth time values are, respectively, 134 and 172, a fluctuation range of 38 is obtained, which is slightly greater than the fluctuation range of FIG. 19A. However, since the first color corresponds to the yellow color, which is hardly recognizable by the human eye, the color registration error caused by the first color may not be considered. Referring back to FIG. 19A, since the maximum value and the minimum value of the second to fourth colors are respectively, 158 and 122, the fluctuation range of 36 is obtained. Referring to FIG. 19B, since the maximum value and the minimum value of the second to fourth colors are respectively, 156 and 172, the fluctuation range of 16 is obtained, which is much less than the fluctuation range of FIG. 19A. In this manner, a registration error amount, which may be recognizable by the human eye, may be reduced.

In another example, the first color may be previously determined to be a color, which is used mostly for a character portion, such as the black color. If the timing for starting image formation for the black color is not considered, the overall fluctuation range, which indicates the variance in timing for starting image formation among the other three colors, may be further reduced.

Further, the operation described referring to FIG. 19A and the operation described referring to FIG. 19B may be selected based on a fluctuation range. For example, a timing controller 760 of FIG. 20 may be provided in replace of the timing controller 700 of FIG. 4 or the timing controller 750 of FIG. 15.

Figure 20:
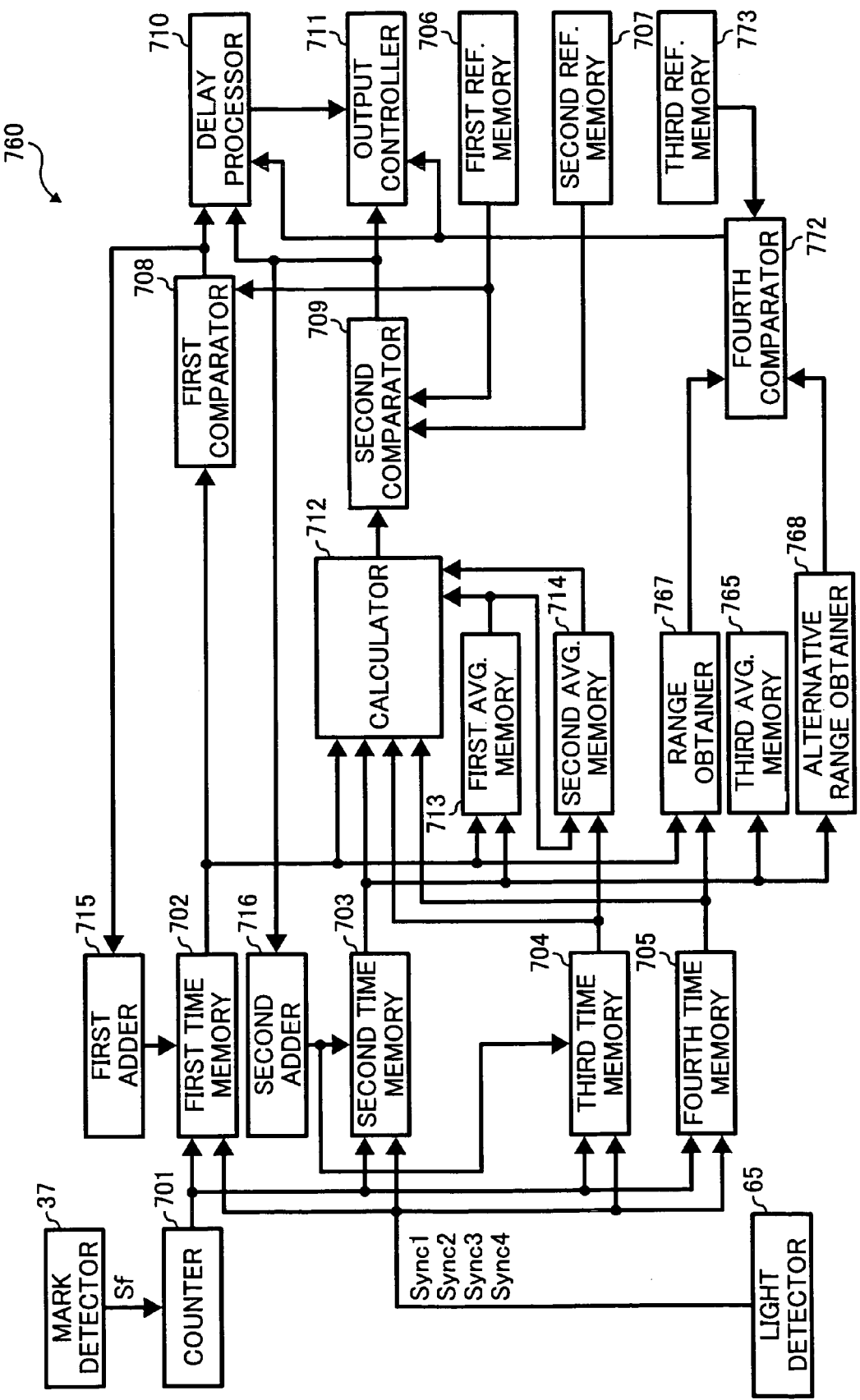
FIG. 20 is a schematic block diagram illustrating the functional structure of a timing controller incorporated in the image forming apparatus of FIG. 1, according to an exemplary embodiment of the present invention.

The timing controller 760 of FIG. 20 is substantially similar to the timing controller 700 of FIG. 4. The difference include the addition of a third average memory 765, a range obtainer 767, an alternative range obtainer 768, a third range difference memory 770, a fourth comparator 772, and a third reference memory 773.

The third average memory 765 stores a third average value ta3, which is the average of the second time value t2 and the third time value t3.

The range obtainer 767 obtains a fluctuation range. In one example, the range obtainer 767 obtains a first fluctuation range of the first time value t1, the second time value t2, and the third time value t3, by specifying a maximum value and a minimum value of the first, second, and third time values t1, t2 and t3. In another example, the range obtainer 767 obtains a second fluctuation range of the first time value t1, the second time value t2, the third time value t3, and the fourth time value t4, by specifying a maximum value and a minimum value of the first, second, third, and fourth time values t1, t2, t3, and t4.

The alternative range obtainer 768 obtains an alternative fluctuation range, in which the first time value t1 is not considered. In one example, the alternative range obtainer 768 obtains an alternative third time value t3 in a substantially similar manner as described referring to FIG. 19B, and obtains an alternative fluctuation range of the second time value t2 and the third time value t3. In another example, the alternative value obtainer 768 obtains an alternative fourth time value t4 in a substantially similar manner as described referring to FIG. 19B, and obtains an alternative fluctuation range of the second time value t2, the third time value t3, and the fourth time value t4.

The third range difference memory 770 obtains a range difference value between the fluctuation range and the alternative fluctuation range.

The third reference memory 773 stores a third reference value S3, which is used for determining whether the first time value t1 should be used for determining third time value t3 or the fourth time value t4. For example, the third reference value S3 may be determined based on an empirical rule.

The fourth comparator 772 compares the range difference value obtained by the third range difference memory 770 with the third reference value S3 to output a sixth comparison result. When the sixth comparison result indicates that the range difference value is greater than the third reference value S3, the fourth comparator 772 determines that the determined time value should be used, which considers the first time value t1. When the sixth comparison result indicates that the range difference value is less than the third reference value S3, the fourth comparator 772 determines that the alternative time value should be used, which does not consider the first time value t1.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Figure 21:
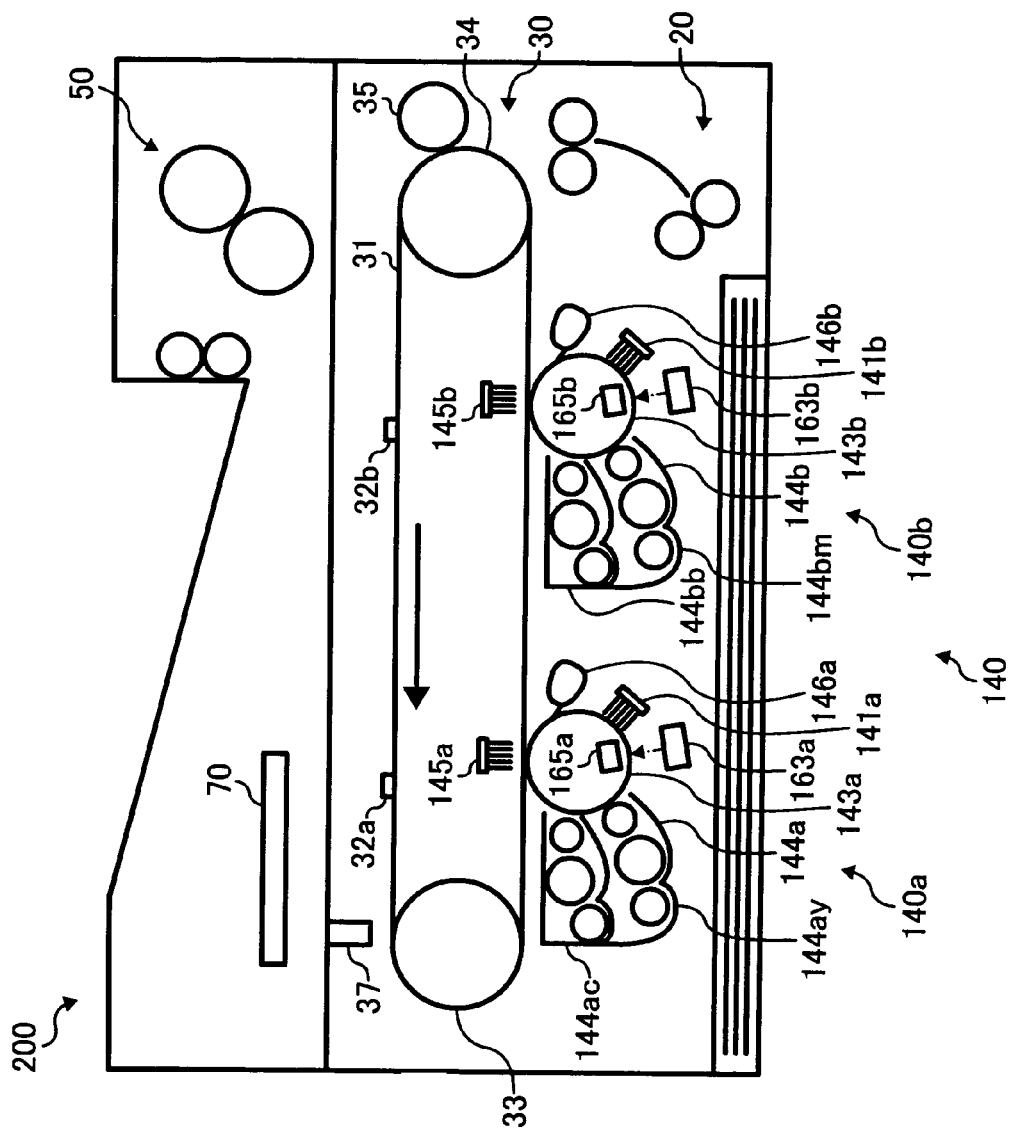
FIG. 21 is a schematic block diagram illustrating the structure of an image forming apparatus according to an exemplary embodiment of the present invention.

Further, any one of the above-described and other methods of exemplary embodiments of the present invention may be practiced by an image forming apparatus having more than one mark, as illustrated in FIG. 21.

The image forming apparatus 200 of FIG. 21 is substantially similar in structure to the image forming apparatus 100 of FIG. 1. The differences include the replacement of the image forming device 40 with an image forming device 140, the replacement of the mark 32 with a first mark 32a and a second mark 32b, the replacement of the deflector 63 with a first deflector 163a and a second deflector 163b, the replacement of the light detector 65 with a first light detector 165a and a second light detector 165b.

As shown in FIG. 21, the image forming device 140 includes a first image forming unit 140a and a second image forming unit 140b. The first image forming unit 140a includes a first charger 141a, a first image carrier 143a, a first developer 144a having a cyan developer 144ac and a yellow developer 144ay, a first transfer section 145a, and a first cleaner 146a. The second image forming unit 140b includes a second charger 141b, a second image carrier 143b, a second developer 144b having a black developer 144bb and a magenta developer 144bm, a second transfer section 145b, and a second cleaner 146b.

In operation, upon detecting the first mark 32a, the mark detector 37 outputs a first image forming start signal. The first light detector 165a outputs a first synchronization signal. The image forming apparatus 200 controls a timing for starting image formation for the yellow color and the cyan color, based on the first image forming start signal and the first synchronization signal. At the same time, upon detecting the second mark 32b, the mark detector 37 outputs a second image forming start signal. The second light detector 165b outputs a second synchronization signal. The image forming apparatus 200 controls a timing for starting image formation for the magenta color and the black color, based on the second image forming start signal and the second synchronization signal.

Furthermore, as described above, any one of the above-described and other methods of exemplary embodiments of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of exemplary embodiments of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image forming apparatus for forming a full color image by superimposing a plurality of color images including a first color image, a second color image, a third color image, and a fourth color image, the apparatus comprising:

an image carrier configured to rotate in a first direction;

an intermediate transfer body including at least one mark thereon, configured to rotate in a direction opposite to the first direction;

a mark detector provided in a vicinity of the intermediate transfer body and configured to output an image forming start signal;

a light detector provided in a vicinity of the image carrier and configured to output a synchronization signal at a timing determined by a periodic cycle value T;

a timing controller configured to determine:

a first time value based on an initial value of the first time value;

a second time value based on a first difference value, wherein the first difference value corresponds to a difference between the first time value and an initial value of the second time value;

a third time value based on a second difference value, wherein the second difference value corresponds to a difference between an initial value of the third time value and a first average value being obtained by averaging the first time value and the second time value; and a fourth time value based on a third difference value, wherein the third difference value corresponds to a difference between an initial value of the fourth time value and a second average value being obtained by averaging the first average value and the third time value, wherein the initial value of each one of the first time value, the second time value, the third time value, and the fourth time value is determined based on a time period between a timing when the image forming start signal is output and the timing when the synchronization signal is output; and an optical writing device configured to scan an n number of light beams in a direction perpendicular to the first direction to form, on a surface of the image carrier, the first color image at a timing indicated by the first time value, the second color image at a timing indicated by the second time value, the third color image at a timing indicated by the third time value, and the fourth color image at a timing indicated by the fourth time value.

2. The apparatus of claim 1, wherein the first time value is equal to the initial value of the first time value when the initial value of the first time value is equal to or greater than a first reference value, and the first time value is equal to a value obtained by adding the periodic cycle value T to the initial value of the first time value when the initial value of the first time value is less than the first reference value.

3. The apparatus of claim 2, wherein the second time value is equal to the initial value of the second time value when the first difference value is less than a second reference value, the second time value is equal to a value obtained by adding the periodic cycle value T to the initial value of the second time value when the first difference value is equal to or greater than the first reference value, and the second time value is equal to a value obtained by adding a cycle fraction value to the initial value of the second time value when the first difference value is equal to or greater than the second reference value but less than the first reference value.

4. The apparatus of claim 3, wherein the third time value is equal to the initial value of the third time value when the second difference value is less than the second reference value, the third time value is equal to a value obtained by adding the periodic cycle value T to the initial value of the third time value when the second difference value is equal to or greater than the first reference value, and the third time value is equal to a value obtained by adding the cycle fraction value to the initial value of the third time value when the second difference value is equal to or greater than the second reference value but less than the first reference value.

5. The apparatus of claim 4, wherein the fourth time value is equal to the initial value of the fourth time value when the third difference value is less than the second reference value, the fourth time value is equal to a value obtained by adding the periodic cycle value T to the initial value of the fourth time value when the third difference value is equal to or greater than the first reference value, and the fourth time value is equal to a value obtained by adding the cycle fraction value to the initial value of the fourth time value when the third difference value is equal to or greater than the second reference value but less than the first reference value.

6. The apparatus of claim 5, wherein the first reference value can be expressed by $(2n-1)T/2n$, the second reference value can be expressed by $T/2n$, and the cycle fraction value can be expressed by $T/n$.

7. The apparatus of claim 1, wherein the second time value, the third time value, and the fourth time value are determined respectively so as to minimize the first difference value, the second difference value, and the third difference value.

8. The apparatus of claim 1, wherein the second time value, the third time value, and the fourth time value are determined respectively so as to be substantially equal to the first time value.

9. The apparatus of claim 7, wherein the timing controller is further configured to obtain a first fluctuation range indicating variance of the first time value and the second time value to determine whether the third time value is within the first fluctuation range.

10. The apparatus of claim 9, wherein the timing controller is further configured to compare, when the third time value is not within the first fluctuation range, the third time value with an alternative third time value to determine whether the alternative third time value is more preferable than the third time value, wherein the alternative third time is obtained by adding or subtracting a cycle fraction value to or from the third time value.

* * * * *